United States Patent
Suzuki et al.

(10) Patent No.: US 9,167,547 B2
(45) Date of Patent: Oct. 20, 2015

(54) UPLINK TIMING MAINTENANCE UPON TIME ALIGNMENT TIMER EXPIRY

(71) Applicant: Research In Motion Limited, Waterloo (CA)

(72) Inventors: Takashi Suzuki, Ichikawa (JP); Zhijun Cai, Euless, TX (US); Andrew Mark Earnshaw, Kanata (CA)

(73) Assignee: BlackBerry Limited, Waterloo, Ontario (CA)

( * ) Notice: Subject to any disclaimer, the term of this patent is extended or adjusted under 35 U.S.C. 154(b) by 180 days.

(21) Appl. No.: 13/770,376

(22) Filed: Feb. 19, 2013

(65) Prior Publication Data

US 2014/0086219 A1    Mar. 27, 2014

Related U.S. Application Data

(60) Provisional application No. 61/706,703, filed on Sep. 27, 2012.

(51) Int. Cl.
  *H04W 56/00* (2009.01)
(52) U.S. Cl.
  CPC ........ *H04W 56/0055* (2013.01); *H04W 56/003* (2013.01); *H04W 56/0005* (2013.01); *H04W 56/0045* (2013.01)
(58) Field of Classification Search
  USPC ......... 370/328, 329, 336, 331, 216, 350, 252, 370/312, 330
  See application file for complete search history.

(56) References Cited

U.S. PATENT DOCUMENTS

| | | | | |
|---|---|---|---|---|
| 2001/0036168 A1* | 11/2001 | Terry | ............................ | 370/337 |
| 2005/0003829 A1* | 1/2005 | Lala et al. | .................. | 455/456.1 |
| 2009/0141701 A1* | 6/2009 | Dalsgaard | ...................... | 370/350 |
| 2009/0232236 A1* | 9/2009 | Yamamoto et al. | ........... | 375/260 |
| 2010/0284376 A1* | 11/2010 | Park et al. | ..................... | 370/336 |
| 2011/0222476 A1* | 9/2011 | Hole et al. | ..................... | 370/328 |
| 2011/0222527 A1* | 9/2011 | Hole et al. | ..................... | 370/348 |
| 2011/0223932 A1* | 9/2011 | Hole et al. | ................. | 455/456.1 |
| 2012/0014371 A1* | 1/2012 | Weng et al. | .................... | 370/350 |
| 2012/0040659 A1* | 2/2012 | Iwamura et al. | ........... | 455/422.1 |

(Continued)

FOREIGN PATENT DOCUMENTS

EP     2408243     1/2012

OTHER PUBLICATIONS

Ericsson, 3GPP TSG-RAN2 Meeting #78: R2-122586, 3GPP, May 21-25, 2012.*
Ericsson, ST-Ericsson; "Timing Advance Value upon Timing Advance Timer Expiry"; 3GPP TSG-RAN WG2 #78 (R2-122585); Prague, Czech Republic; May 21-25, 2012; 2 pages.

(Continued)

*Primary Examiner* — Benjamin H Elliott, IV
*Assistant Examiner* — Eric Nowlin
(74) *Attorney, Agent, or Firm* — Fish & Richardson P.C.

(57) ABSTRACT

Systems, apparatuses, and methods for uplink timing maintenance in wireless communications are provided. Certain aspects of the disclosure involve applying a timing advance command to adjust uplink transmission timing/resume uplink synchronization; and determining a metric. The metric can be used in determining whether to apply a timing advance command (TAC) to resume uplink resynchronization.

23 Claims, 16 Drawing Sheets

(56) References Cited

U.S. PATENT DOCUMENTS

| | | | |
|---|---|---|---|
| 2012/0243514 A1* | 9/2012 | Wu | 370/336 |
| 2012/0287920 A1* | 11/2012 | Futaki et al. | 370/350 |
| 2013/0083675 A1* | 4/2013 | Yamada | 370/252 |
| 2013/0084869 A1* | 4/2013 | Johansson et al. | 455/436 |
| 2013/0242973 A1* | 9/2013 | Bertrand et al. | 370/350 |
| 2014/0211738 A1* | 7/2014 | Park et al. | 370/329 |

OTHER PUBLICATIONS

Invitation to Pay Additional Fees and Partial International Search Report issued in International Application No. PCT/US2013/046299 on Sep. 26, 2013; 5 pages.

International Search Report and Written Opinion of the International Searching Authority issued in International Application No. PCT/US2013/046299 on Feb. 12, 2014; 15 pages.

* cited by examiner

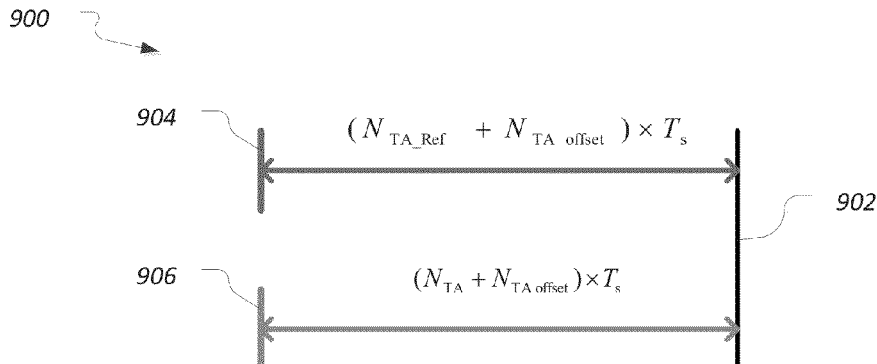
FIG. 9-a
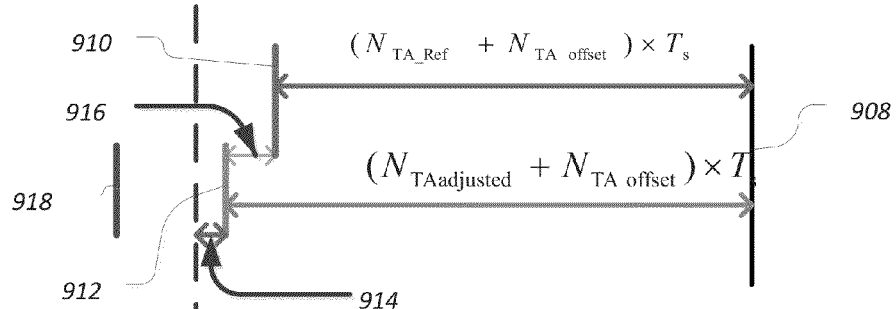
FIG. 9-b
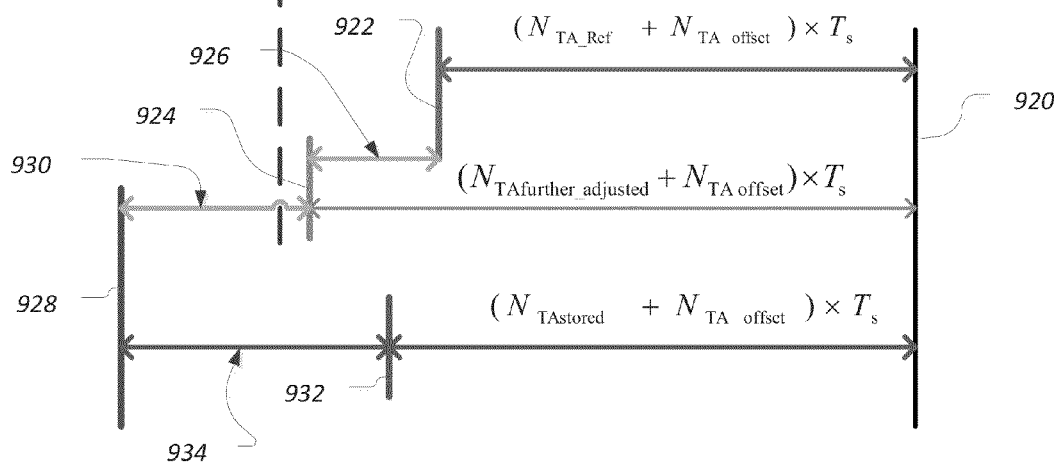
FIG. 9-c

UPLINK TIMING MAINTENANCE UPON TIME ALIGNMENT TIMER EXPIRY

CLAIM OF PRIORITY

This application claims priority under 35 USC §119(e) to U.S. Patent Application Ser. No. 61/706,703, filed on Sep. 27, 2012, the entire contents of which are hereby incorporated by reference.

BACKGROUND

This disclosure relates to uplink timing maintenance in wireless communication systems.

Wireless communication systems can include a network of one or more base stations to communicate with one or more wireless devices such as fixed and mobile wireless communication devices, mobile phones, or laptop computers with wireless communication cards. Base stations can emit radio signals that carry data such as voice data and other data content to wireless devices. A base station can transmit a signal on a downlink (DL), to one or more wireless devices. A wireless device can transmit a signal on an uplink (UL), to one or more base stations.

The uplink signals from multiple wireless devices may go through different paths and experience different propagation delays to arrive at one base station. The base station may need to control the transmission timing of the wireless devices such that the uplink signals from multiple wireless devices are time aligned when the signals arrive at the base station. An absence of time alignment may cause significant interference to other uplink users. One of the main purposes of time alignment is to counteract different propagation delays among multiple wireless devices.

BRIEF DESCRIPTION OF THE DRAWINGS

FIG. 9a-c is a schematic illustrating an example time chart for timing advance adjustment upon received downlink timing changes.

DETAILED DESCRIPTION

Figure 1:
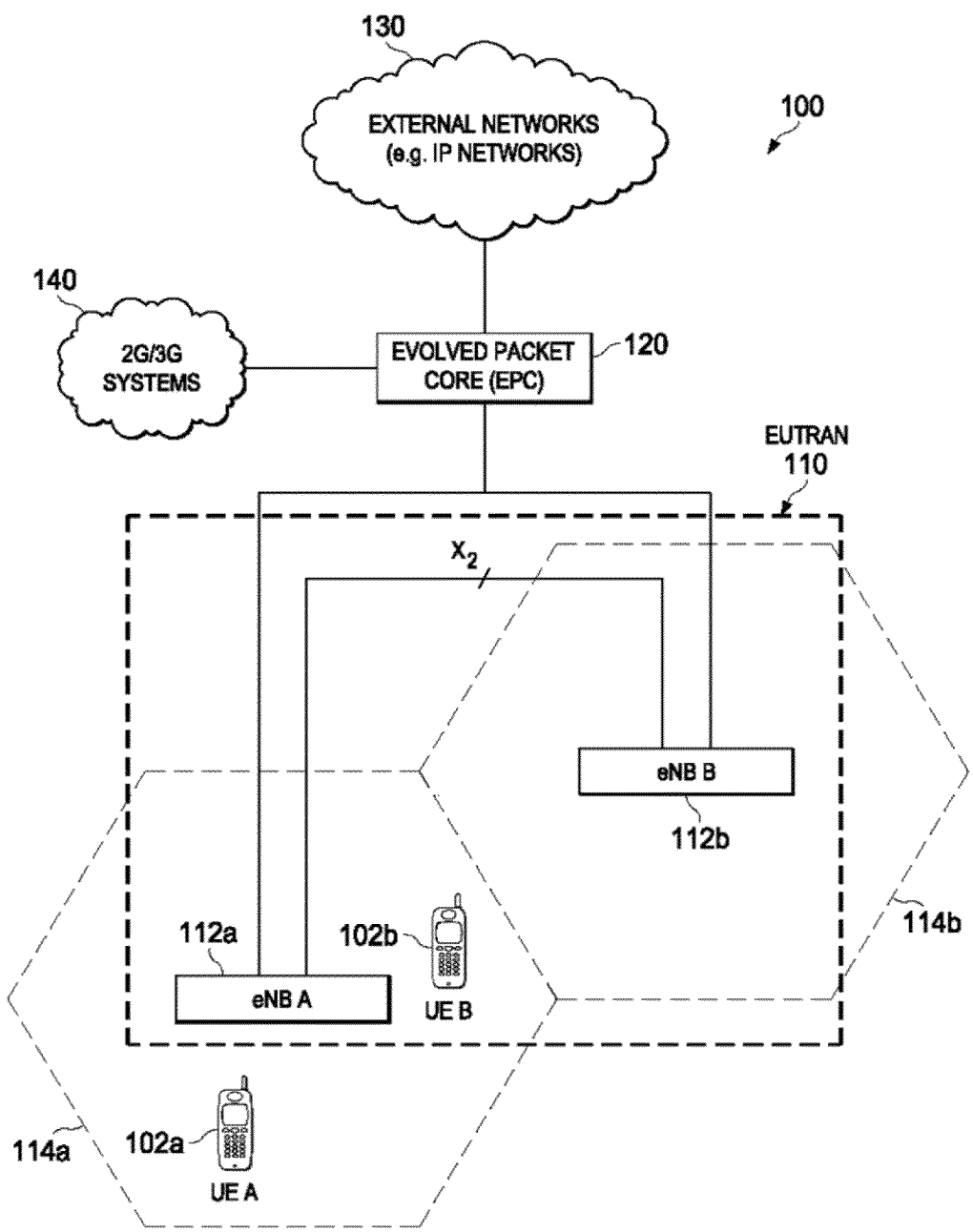
FIG. 1 is a schematic block diagram of an example wireless communication system.

Certain aspects of the disclosure are directed to systems, methods, and apparatuses for providing uplink timing maintenance in wireless communication systems.

One aspect features a method for controlling uplink transmission timing of a wireless communications network. The network comprising a base station and a User Equipment (UE). The method includes applying a first timing advance command to resume uplink synchronization; determining a time limit, the time limit identifies an amount of time elapsed, relative to an expiration of a time alignment timer (TAT), until an uplink transmission error exceeds a timing error limit; and determining whether to use a timing advance command to resume uplink synchronization based on the determined time limit.

In some examples, the method includes, if the elapsed time since the first timing advance command being applied is within the time limit, using the timing advance command to resume uplink synchronization; and if the elapsed time since the first timing advance command being applied exceeds the time limit, refraining from using the timing advance command to resume uplink synchronization.

In some implementations, the uplink transmission error is a timing difference between the uplink transmission timing and a reference timing, wherein the reference timing can be a predetermined amount of time prior to downlink timing. In some examples, the downlink timing is defined as the time when the first detected path in time of a corresponding downlink frame is received by the user equipment.

In another example, the time limit can be calculated based on the timing error limit value, the speed of light, a speed of the user equipment and whether the stored timing advance is adjusted by the user equipment or timing advance is adjusted when TAT is not running.

In some examples, the method includes estimating a speed of the user equipment; determining a speed limit of the user equipment; and determining whether to use a timing advance command to resume uplink synchronization based on the determined speed limit and the estimated speed of the user equipment. In some implementations, the method further includes using a timing advance command to resume uplink synchronization if the estimated speed of the user equipment is lower than the speed limit of the user equipment; and not using a timing advance command to resume uplink synchronization if the estimated speed of the user equipment exceeds the speed limit of the user equipment. In some implementations, the speed estimation can be done by the network based on number of cells UE has visited per unit of time and cell radius information. In some examples, the method includes considering an margin of error of the speed estimation of the user equipment. In some implementations, the speed limit of the user equipment can be calculated based on the timing error limit value, the speed of light, whether the stored timing advance is adjusted by the user equipment or timing advance is adjusted when TAT is not running, and a resynchronization time, the resynchronization time is the time taken to resynchronize an unsynchronized user equipment. In some implementations, the resynchronization time may contain a detection time which is the time taken to detect that the user equipment is not uplink synchronized; and a scheduling time which is the time taken to schedule and transmit a timing advance command for re-establishing uplink synchronization. In some scenarios, the scheduling time may further contain a retransmission delay. In another implementation, the user equipment can use its geo-positioning capability and/or inertia sensor or accelerometer to estimate the speed or a range of speed of the user equipment. In some cases, the method further includes, at the user equipment, sending the network a mobility status indicator; and at the base station, determining how to apply the timing advance command based on the mobility indicator. In another implementation, the method further contains the base station determining a frequency of sending a timing advance command medium access control (MAC) control element based on the mobility status indicator of the user equipment. In yet another implementation, the method includes the base station determining a value of a time alignment timer (TAT) based on the mobility status indicator of the user equipment.

Another aspect features a method for controlling uplink transmission timing of a wireless communications network. The network comprising a base station and a User Equipment (UE). The method includes determining a distance limit; and determining whether to use the timing advance command to resume uplink synchronization based on the determined distance limit.

In some examples, the method includes using the timing advance command to resume uplink synchronization if a travelled distance of the UE since the TAT has expired is within the distance limit; and refraining from using the timing advance command to resume uplink synchronization if the travelled distance of the UE since the first timing advance command being applied exceeds the time limit.

In some implementations, the distance limit can be calculated based on a timing error limit value, the speed of light, and whether the stored timing advance is adjusted by the user equipment or timing advance is adjusted when TAT is not running. In some instances, the method further contains estimating the travel distance of the user equipment; and determining whether to use a timing advance command to resume uplink synchronization based on the determined distance limit and the estimated travelled distance of the user equipment. In some examples, the method further includes using a timing advance command to resume uplink synchronization if the estimated travelled distance of the user equipment is smaller than the distance limit of the user equipment; and refraining from using a timing advance command to resume uplink synchronization if the estimated travelled distance of the user equipment is larger than or equal to the distance limit of the user equipment.

Another aspect features a method for controlling uplink transmission timing of a wireless communications network. The method includes, at a User Equipment (UE), detecting a mobility status of the UE and configuring the frequency of transmitting one or more uplink control information (UCI) types to a predetermined value; and, at the base station, determining the frequency of receiving the one or more UCI types; and determining the mobility status of the UE based on the frequency of receiving the one or more UCI types.

In some examples, the method further includes determining how to apply the timing advance command based on the frequency of receiving of the one or more UCI indicators. In some implementations, the one or more UCI types include one or more of channel state information (CSI), a precoding matrix index (PMI), a precoding type indicator (PTI), a rank indicator (RI), or a sounding reference signal (SRS).

In some implementations, the predetermined value of the frequency of the one or more UCI types may be indicated as a field of a MAC-mainconfig information element included in an RRC connection reconfiguration message. The field is denoted by uci-FrequencyStational. In some scenarios, the method further includes, at the UE, receiving the uci-FrequencyStational information element; and configuring the frequency of transmitting one or more UCI types to be uci-FrequencyStational times a long DRX cycle. In some examples, when DRX is configured, the method further includes refraining from transmitting a sounding reference signal (SRS) when one or more of the following conditions are met: uci-FrequencyStational is configured by upper layer; the UE detects stationary state, and on DurationTimer is running; a long discontinuous reception (DRX) cycle is used; there is no on-going data transmission or retransmission; or an on-duration period of the DRX cycle does not satisfy uci-FrequencyStational. In another example, the method contains, when discontinuous reception (DRX) mode is configured, refraining from reporting one or more of CQI/PMI/RI/PTI on PUCCH if channel quality indicator masking (cqi-Mask) is setup by upper layers when: on DurationTimer is not running; or when uci-FrequencyStational is configured by upper layer and the UE detects stationary state, on DurationTimer is running, a long DRX cycle is used, there is no on-going data transmission or retransmission, and an on-duration period of the DRX mode does not satisfy uci-FrequencyStational. In yet another example, the method includes, when discontinuous reception (DRX) mode is configured, further comprising refraining from reporting CQI/PMI/RI/PTI on PUCCH if CQI masking (cqi-Mask) is not setup by upper layers and when not in Active Time; or when uci-FrequencyStational is configured by upper layer and the UE detects stationary state, an on DurationTimer is running, a long DRX cycle is used, there is no on-going data transmission or retransmission, and an on-duration period of the DRX mode does not satisfy uci-FrequencyStational.

Another aspect features a method for controlling uplink transmission timing of a wireless communications network. The network comprising a base station and a User Equipment (UE). The method includes, at the base station in communication with the UE, applying a Timing Advance Command (TAC) Medium Access Control (MAC) Control Element (CE) for uplink transmission timing; and sending instruction to the UE if the UE receives TAC MAC CE when a Time Alignment Timer (TAT) is expired.

In some examples, the instruction is included in broadcast or dedicated Radio Resource Control (RRC) signaling.

In some examples, the method further includes the UE applying TAC and restarting the TAT.

In some examples, the method further contains the UE applying TAC and restarting TAT if less than a specified time has elapsed since TAT expiry.

In some examples, the method further contains the UE applying TAC and restarting TAT if UE speed is less than a specified value.

In some examples, the method further contains the UE applying TAC and restarting TAT if UE travel distance is less than a specified value.

In some examples, the method further contains comprising the UE not applying TAC and initiating a random access procedure instead.

These general and specific aspects may be implemented using a method, a system, user equipment, a base station, or any combination of methods, systems, user equipment and base stations.

FIG. 1 is a schematic block diagram of an example mobile communication system 100. The mobile communication system 100 shown in FIG. 1 may include one or more network nodes (e.g., 112a and 112b). It will be understood that the network node may take several forms in a mobile communication system, such as (but not limited to) an evolved Node B (eNB), a base station, a Node B, a wireless access point, a radio network controller, a base transceiver station, a layer two relay node, a layer three relay node, a femto cell, home evolved Node B (HeNB), a home Node B (HNB), a base station controller, or other network node that includes radio resource control. In the long term evolution (LTE) example of FIG. 1, the network nodes are shown as evolved Node Bs (eNBs) 112a and 112b. The example mobile communication system 100 of FIG. 1 may include one or more radio access networks 110, core networks (CNs) 120, and external networks 130. In certain implementations, the radio access networks 110 may be Evolved Universal Mobile Telecommunications System (UMTS) terrestrial radio access networks (E-UTRAN). In addition, in certain instances, core networks 120 may be evolved packet cores (EPCs). Further, there may be one or more mobile electronic devices 102a, 102b operating within the mobile communication system 100. In some implementations, 2G/3G systems 140, e.g., Global System for Mobile communication (GSM), Interim Standard 95 (IS-95), Universal Mobile Telecommunications System (UMTS) and CDMA2000 (Code Division Multiple Access) may also be integrated into the mobile communication system 100.

The wireless communication system may communicate with wireless devices 102a and 102b using a wireless technology such as one based on orthogonal frequency division multiplexing (OFDM), Orthogonal Frequency Division Multiple Access (OFDMA), Single Carrier Frequency Division Multiple Access (SC-FDMA), Discrete Fourier Transform Spread Orthogonal Frequency Division Multiplexing (DFT-SOFDM), Space-Division Multiplexing (SDM), Frequency-Division Multiplexing (FDM), Time-Division Multiplexing (TDM), Code Division Multiplexing (CDM), or others. The wireless communication system may support frequency division duplex (FDD) and time division duplex (TDD) modes.

The wireless communication system may transmit information using Medium Access Control (MAC) and Physical (PHY) layers. The techniques and systems described herein may be implemented in various wireless communication systems such as a system based on LTE, LTE-Advanced (LTE-A), GSM, CDMA, UMTS, Unlicensed Mobile Access (UMA), or others.

In the example LTE system shown in FIG. 1, the radio access network 110 includes eNB 112a and eNB 112b. Cell 114a is the service area of eNB 112a, and Cell 114b is the service area of eNB 112b. In this example, UEs 102a and 102b operate in Cell 114a and are served by eNB 112a. The UEs 102a and 102b can move around within the Cell 114a, or move across cells to Cell 114b. The UEs 102a and 102b may transmit voice data, video data, user data, application data, multimedia data, text, web content and/or any other content.

The UE 102a or 102b may be referred to as mobile electronic device, user device, mobile station, subscriber station, portable electronic device, mobile communications device, wireless modem, or wireless terminal. Examples of a UE (e.g. UE 102a or 102b) may include a cellular phone, personal data assistant (PDA), smart phone, laptop, tablet personal computer (PC), pager, portable computer, portable gaming device, wearable electronic device, or other mobile communications device having components for communicating voice or data via a mobile communication network.

Other examples of a UE include, but are not limited to, a television, a remote controller, a set-top box, a computer monitor, a computer (including a tablet, a desktop computer, a handheld or laptop computer, a netbook computer), a microwave, a refrigerator, a stereo system, a cassette recorder or player, a DVD player or recorder, a CD player or recorder, a VCR, an MP3 player, a radio, a camcorder, a camera, a digital camera, a portable memory chip, a washer, a dryer, a washer/dryer, a copier, a facsimile machine, a scanner, a multi-functional peripheral device, a wristwatch, a clock, and a game device, etc. The term "UE" can also refer to any hardware or software component that can terminate a communication session for a user. In addition, the terms "user equipment," "UE," "user equipment device," "user agent," "UA," "user device," and "mobile device" can be used synonymously herein.

Though described in terms of FIG. 1, the present disclosure is not limited to such an LTE environment.

Figure 2:
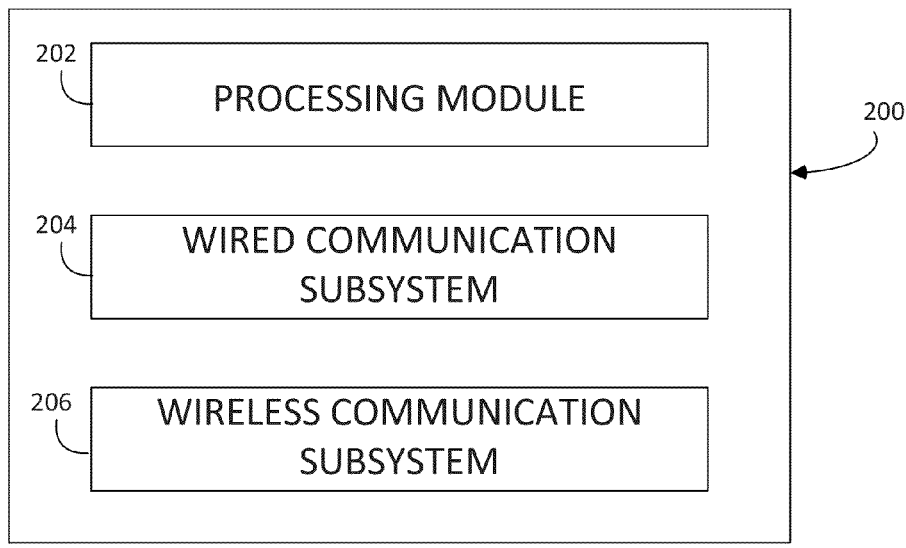
FIG. 2 is a schematic illustrating an example network node.

FIG. 2 is a schematic illustrating an example network node 200. The example network node 200 includes a processing module 202, a wired communication subsystem 204, and a wireless communication subsystem 206. The processing module 202 can include one or more processing components (also referred to as "processors" or "central processing units" (CPUs)) operable to execute instructions associated with managing uplink time alignment. The processing module 202 can also include other auxiliary components, such as random access memory (RAM), read only memory (ROM), secondary storage (for example, a hard disk drive or flash memory). The processing module 202 can execute certain instructions and commands to provide wireless or wired communication, using the wired communication subsystem 204 or a wireless communication subsystem 206. A skilled artisan will readily appreciate that various other components can also be included in the example network node 200.

A radio access network is part of a mobile communication system which implements a radio access technology, such as UMTS, CDMA2000 and 3GPP LTE. For example, the radio access network (RAN) 110 included in an LTE telecommunications system is called an EUTRAN. The EUTRAN can be located between the UEs and core network 120 (e.g. an evolved core network, EPC). The EUTRAN includes at least one eNB. The eNB can be a radio base station that may control all or at least some radio related functions in a fixed part of the system. The at least one eNB can provide radio interface within their coverage area or a cell for the UEs to communicate. The eNBs may be distributed throughout the cellular network to provide a wide area of coverage. The eNBs directly communicate with one or more UEs, other eNBs, and the core network.

Figure 3:
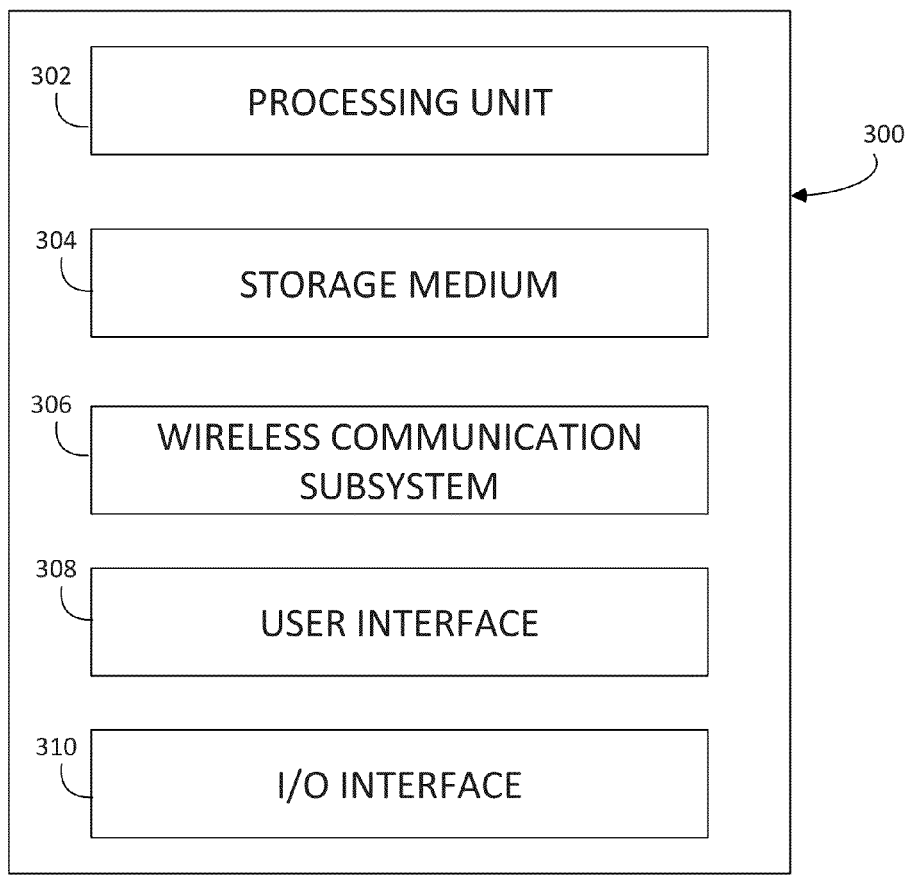
FIG. 3 is a schematic illustrating an example user equipment device.

FIG. 3 is a schematic illustrating an example UE apparatus. The example UE 300 includes a processing unit 302, a computer readable storage medium 304 (for example, ROM or flash memory), a wireless communication subsystem 306, a user interface 308, and an I/O interface 310. The wireless communication subsystem 306 may be configured to provide wireless communications for data information or control information provided by the processing unit 302. The wireless communication subsystem 306 can include, for example, one or more antennas, a receiver, a transmitter, a local oscillator, a mixer, and a digital signal processing (DSP) unit. In some embodiments, the wireless communication subsystem 306 can support multiple input multiple output (MIMO) transmissions.

The user interface 308 can include, for example, one or more of a screen or touch screen (for example, a liquid crystal display (LCD), a light emitting display (LED), an organic light emitting display (OLED), a microelectromechanical system (MEMS) display), a keyboard or keypad, a trackball, a speaker, and a microphone. The I/O interface 310 can include, for example, a universal serial bus (USB) interface. A skilled artisan will readily appreciate that various other components can also be included in the example UE device 300.

The LTE system utilizes an orthogonal uplink multiple access scheme termed Single Carrier Frequency Division Multiplexing (SC-FDMA). The LTE uplink comprises three fundamental physical channels: PUSCH; PUCCH; PRACH; and/or others. The PUSCH (Physical Uplink Shared Channel) is allocated dynamically to users within the cell by the eNB scheduler via its transmission of uplink grants on a Physical Downlink Control Channel (or PDCCH). The PUCCH (Physical Uplink Control Channel) comprises frequency resources at the upper and lower ends of the system bandwidth. Resources for a given UE on PUCCH are either semi-statically assigned by the eNB via RRC signaling, or for some purposes are implicitly allocated by the presence and location of a PDCCH (for example, HARQ ACK/NACK feedback for a downlink allocation may be sent on part of a shared pool of PUCCH resources, the specific portion used being associated with the location of the PDCCH). PUCCH may be used to send one or more of the following control information fields: CQI (Channel Quality Indicator); Hybrid Automatic Retransmission reQuest (HARQ) ACKnowledgment/Negative ACKnowledgment (ACK/NACK); PMI (Precoding Matrix Indicator); RI (Rank Indicator); PTI (Precoding Type Indicator); DSR (Dedicated Scheduling Request); SRS (Sounding Reference Signal); and/or others. Channel State Information (CSI) may include one or more of CQI, PMI, and RI, The PRACH (Physical Random Access Channel) comprises time and frequency resources set aside within the system for the purposes of receiving random-access preamble transmissions from UEs within the cell. In addition to the above physical channel types, there are also two uplink physical signals: DMRS and SRS. The DMRS (Demodulation Reference Signals) are embedded (time division multiplexed) into PUSCH and PUCCH transmissions to enable the receiver to estimate the radio channel through which the PUSCH or PUCCH has passed and to thereby facilitate demodulation. The SRS (Sounding Reference Signals) are also time division multiplexed (from the UE perspective) with other uplink physical channels and physical signals. SRS may be used by the base station to support a variety of radio link maintenance and control features, such as the above-mentioned frequency selective scheduling technique, radio link timing control, power control, and/or others.

Figure 4:
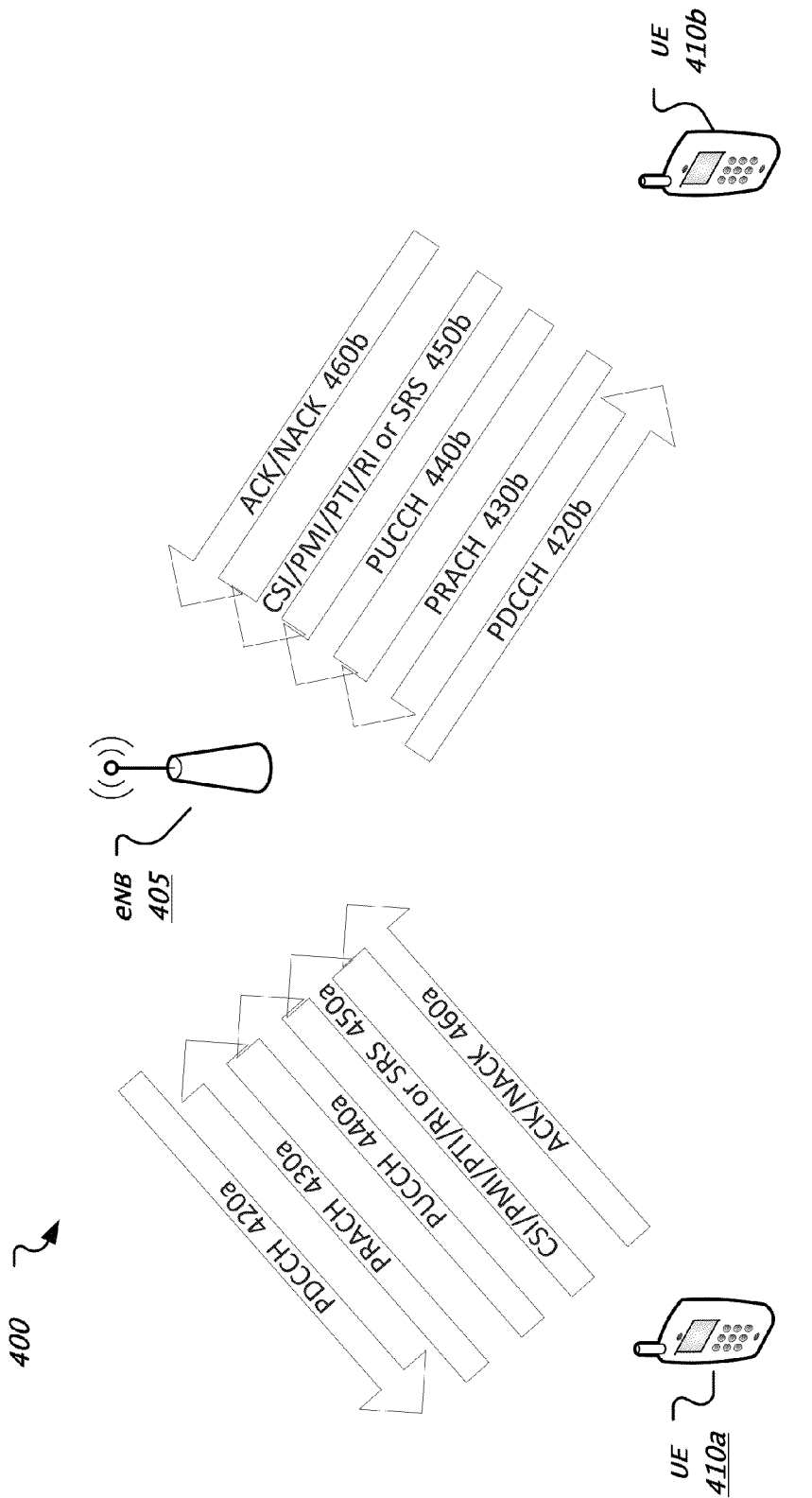
FIG. 4 is a schematic illustrating an example of signaling and traffic between a user equipment (UE) and a network node (e.g. an eNB).

FIG. 4 is a schematic diagram illustrating an example environment 400 of user equipment (UE) 410a and 410b communicating signal and signaling feedback to the network node 405 (e.g. eNB). In FIG. 4, the control elements PDCCH (420a and 420b) are transmitted to the UEs from the eNB while PRACH (430a and 430b), PUCCH (440a and 440b), and some related uplink control information (UCI), for example, CSI/PMI/PTI/RI or SRS (450a and 450b) and ACK/NACK (460a and 460b), are transmitted to the eNB from each UE.

A wireless device can transition between UE connection states, such as Radio Resource Control (RRC) connection modes. In the LTE system, two RRC connection modes exist, RRC connected and RRC idle. In an RRC connected mode, a dedicated radio connection and one or more radio access bearers are established to enable the transfer of user plane data and control plane data through a radio access network and onwards to the core network. In the RRC idle mode, a dedicated radio connection and radio access bearers are not established and user-plane data is not transferred. In some implementations, a limited degree of control signaling is possible in idle mode to enable the UE to establish a radio connection to the wireless network should a need for communications arise.

A wireless device, in an RRC-connected state, can use a DRX operational mode to conserve power by turning-off transceiver functionality, e.g., turning-off transceiver circuitry such as receiver circuitry. In some implementations, a wireless device ceases to monitor a wireless channel and, accordingly, ceases to operate a digital signal processor to decode wireless signals while in the DRX operational mode.

Figure 5:
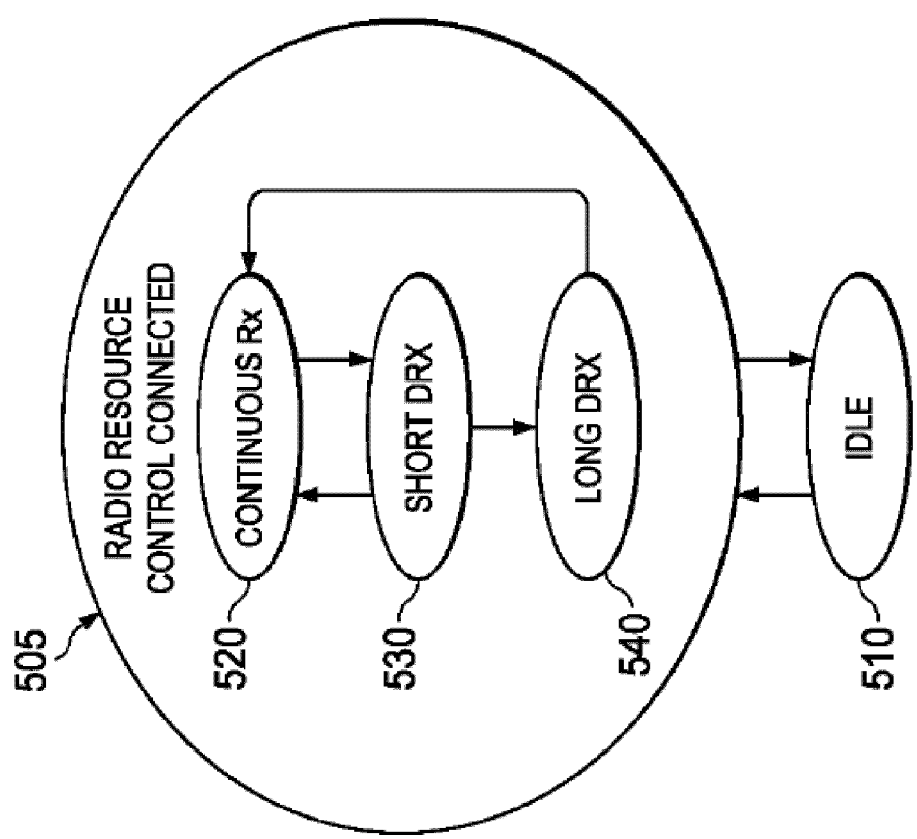
FIG. 5 is an example of a transition diagram for discontinuous reception while in Radio Resource Control (RRC) connected state.

FIG. 5 shows an example of a transition diagram for RRC connection states and DRX. RRC connection states include an RRC connected state 505 and an idle state 510. Transitions between the idle state 510 and the connected state 505 are effected via RRC connection establishment and release procedures. Such transitions can produce associated signaling traffic between a wireless device and a base station.

The RRC connected mode state 505 may be associated with a plurality of DRX sub-states (or DRX status) within the Medium Access Control (MAC) layer. The DRX sub-states (or DRX status) include a continuous reception (continuous-rx) state 520, a short DRX state 530, and a long DRX state 540. In the continuous reception state 520, a device may be continuously monitoring all or almost all downlink sub-frames for wireless traffic and can transmit data. In the short DRX state 530, the device can be controlled to turn off its receiver (e.g., sleep, or DRX) for all but Q out of N sub-frames. In the long DRX state 540, the device can be controlled to turn off its receiver (e.g., sleep, or DRX) for all but Q out of M sub-frames, where M is typically greater than N and M is typically an integer multiple of N. In one example, Q equals 1, N equals 8 and M equals 256. In an LTE-based system, a sub-frame is a 1 millisecond unit of transmission time.

In some implementations, an expiration of an inactivity timer causes a state transition (e.g., continuous reception state 520 to short DRX state 530 or short DRX state 530 to long DRX state 540). Resumption of activity, such as the device having data to transmit or receiving new data, can cause a transition from a DRX state 530, 540 to the continuous reception state 520. In some implementations, a base station sends a MAC control element that causes a transition from the continuous reception state 520 to one of the DRX states 530, 540. In other words, MAC control element may also be used by the network (sent from eNB to the UE) in order to explicitly direct a transition to a different DRX sub-state with a longer DRX cycle. A resumption of data activity typically results in a transition to the continuous reception sub-state.

Figure 6:
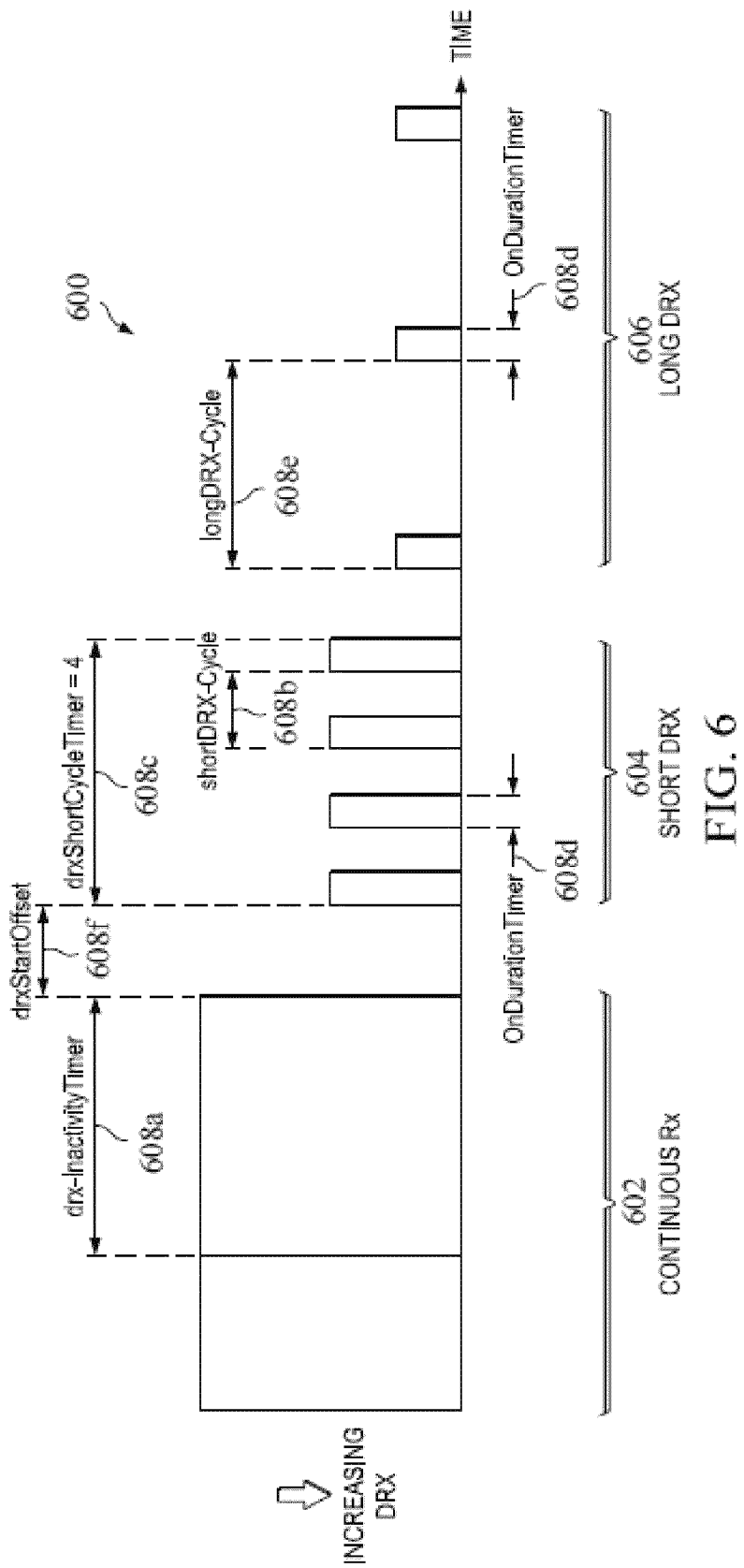
FIG. 6 is a schematic illustrating an example of different reception patterns.

FIG. 6 is a schematic diagram 600 illustrating the different reception patterns and associated parameters. In particular, the diagram 600 includes the Continuous Rx 602, short DRX 604, and Long DRX 606. Within RRC Connected Mode, the DRX reception patterns 604 and 606 (defined at the sub-frame level in the time domain) may be controlled by the network assigning various timers and parameters to the UE. The following parameters, defined in 3GPP technical specification 36.321, may determine the DRX patterns 604 and 606: drx-InactivityTimer 608a; shortDRX-Cycle 608b; drx-ShortCycleTimer 608c; on DurationTimer 608d; longDRX-Cycle 608e; drxStartOffset 608f; and/or others. The drx-InactivityTimer parameter 608a is the time the UE remains in continuous-Rx mode after reception of the last new packet. The shortDRX-Cycle 608b parameter is the fundamental period of the short DRX pattern/duty-cycle. The drxShortCycleTimer parameter 608c is the number of fundamental periods of the short DRX cycle that the UE will remain in short DRX for (if inactivity continues) before transitioning to Long DRX. The onDurationTimer parameter 608d is the number of sub-frames for which the UE is "awake" at the start of each DRX cycle fundamental period. The longDRX-Cycle parameter 608e is the fundamental period of the long DRX pattern/duty-cycle. The drxStartOffset parameter 608f defines the subframe offset for the start of the DRX cycle patterns in short and long DRX. The total length of time that a UE will remain in short DRX when inactive is equal to (shortDRX-Cycle*drxShortCycleTimer) ms.

In cell 114a, the transmissions from the eNB 112a to the UE 102a or 102b are referred to as downlink transmissions, and the transmissions from the UEs 102a or 102b to the eNB 112a are referred to as uplink transmissions. The signal transmissions from the multiple UEs 102a and 102b in a cell 114a may go through different paths and experience different propagation delays to arrive at the eNB 112a. In some instances, the UE 102a or 102b may move towards or away from the eNB 112a. Changes in distance or propagation environment may also cause the propagation delay to vary between the UE 102a or 102b and the eNB 112a. To counteract multiple propagation delays among multiple UEs, the timing of uplink transmissions from multiple UEs may need to be aligned at the receiver of the eNB.

An absence of time alignment may cause significant interference to other uplink users (i.e., a loss of uplink orthogonality of the multiple access scheme which may cause intra-cell interference occurring, both between UEs assigned to transmit in consecutive subframes and between UEs transmitting on adjacent subcarriers). For this reason, users may not transmit on orthogonal uplink resources (PUCCH, PUSCH, SRS) until time alignment has first been established. This alignment may be achieved using transmission of a non-time-aligned preamble on the PRACH (the PRACH may not be an orthogonal resource). The eNB may measure the time of arrival error of the UE's PRACH transmission and sends a timing advance command that may bring the UE into time alignment with other uplink users. Once completed, the eNB may then consider that the time-aligned UE is permitted to use orthogonal uplink resources such as PUCCH, PUSCH and SRS.

Figure 7:
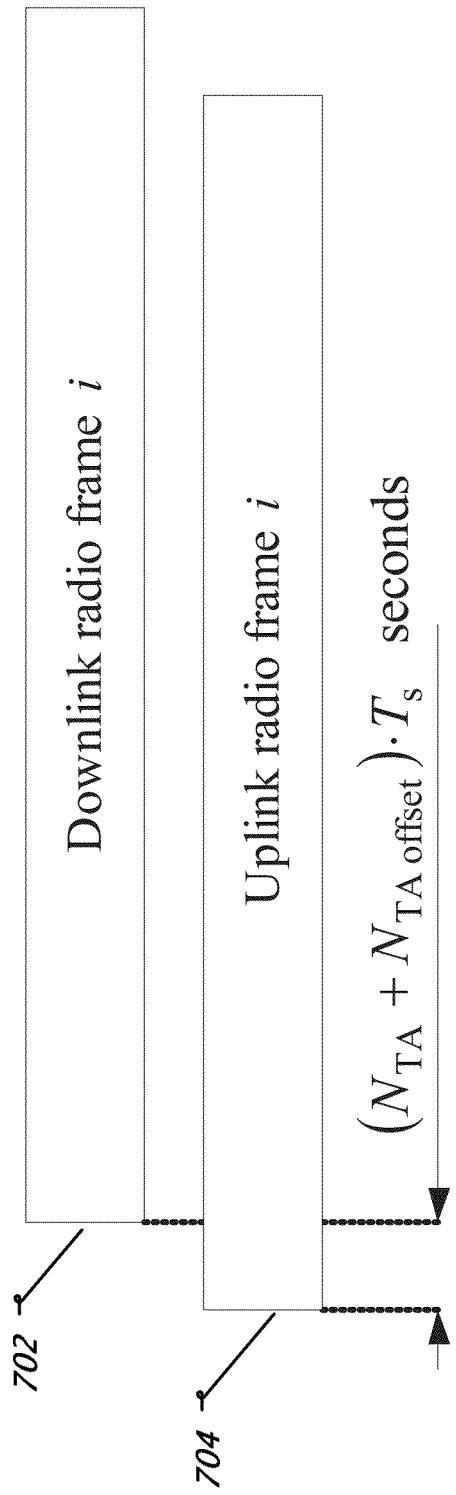
FIG. 7 is a schematic illustrating an example of uplink-downlink timing relation.

FIG. 7 is one embodiment of a typical uplink-downlink timing relation illustrated in 3GPP LTE. Transmission of the uplink radio frame number i 702 from the UE starts ($N_{TA}$+$N_{TA\ offset}$)×$T_s$ seconds before the start of the corresponding downlink radio frame 704 at the UE, where $0 \le N_{TA} \le 20512$, $N_{TA\ offset}=0$, for frame structure type 1 and $N_{TA\ offset}=624$ for frame structure type 2. Ts is the basic time unit $T_s=1/(15000 \times 2048)$ second as specified in 3rd Generation Partnership Project (3GPP) Technical Specification (TS) 36.211. Note that not all slots in a radio frame may be transmitted. One example is TDD, where only a subset of the slots in a radio frame is transmitted.

In some embodiments, during the random access procedure, the UE is given the absolute timing advance value to set $N_{TA}$. The UE is provided the timing advance value for the adjustment of $N_{TA}$ by Timing Advance Command MAC Control Element (TAC MAC CE) as specified in section 4.2.3 of 3GPP TS36.213.

In some embodiments, upon reception of a timing advance command, the UE shall adjust its uplink transmission timing for PUCCH/PUSCH/SRS of the primary cell. The timing advance command indicates the change of the uplink timing relative to the current uplink timing as multiples of 16 $T_s$. The uplink transmission timing for PUSCH/SRS of a secondary cell is the same as the primary cell.

In case of random access response, 11-bit timing advance command, $T_A$, indicates $N_{TA}$ values by index values of $T_A=0, 1, 2, \ldots, 1282$, where an amount of the timing advance is given by $N_{TA}=T_A \times 16$. $N_{TA}$ is defined in 3GPP TS36.133.

In other cases, 6-bit timing advance command, $T_A$, indicates a relative adjustment of the current $N_{TA}$ value, $N_{TA,old}$, to the new $N_{TA}$ value, $N_{TA,new}$, by index values of $T_A=0, 1, 2, \ldots, 63$, where $N_{TA,new}=N_{TA,old}+(T_A-31) \times 16$. Here, adjustment of $N_{TA}$ value by a positive or a negative amount indicates advancing or delaying the uplink transmission timing by a given amount respectively.

For a timing advance command received on subframe n, the corresponding adjustment of the timing can apply from the beginning of subframe n+6. When the UE's uplink PUCCH/PUSCH/SRS transmissions in subframe n and subframe n+1 are overlapped due to the timing adjustment, the UE may transmit complete subframe n and may not transmit the overlapped part of subframe n+1.

To maintain time alignment, in some embodiments, ongoing timing advance commands may be sent by the eNB. These commands may be sent as determined by the eNB or a periodic update methodology can be implemented by the eNB. Each time a timing advance command is sent on the downlink to the UE, the UE may restart a timer known as the "Time Alignment Timer" or TAT. From higher layer perspective, the UE considers it is in uplink synchronization when the time alignment timer (TAT) is running. The timer represents the amount of time the UE is expected to be able to maintain uplink synchronization. The timer starts when the UE receives the timing advance command. Once alignment has been lost, the UE will need to regain alignment when it next needs to transmit. The TAT increments in time until being restarted due to the arrival of a new timing command. If the TAT reaches a certain threshold value (i.e., the timer "expires"), the UE may be out of synchronization and no longer transmit on orthogonal uplink resources.

The TAT may also expire while longer-term (or semi-static) uplink resources (such as periodic PUCCH resource for CQI or periodic resources for SRS) are assigned to the UE. If present, such resources may have been previously assigned via RRC signaling (e.g., at the start of a period of activity). In this event, the 3GPP LTE standard mandates that (on TAT expiry) the UE may release all pre-assigned PUCCH and SRS resources.

Figure 8:
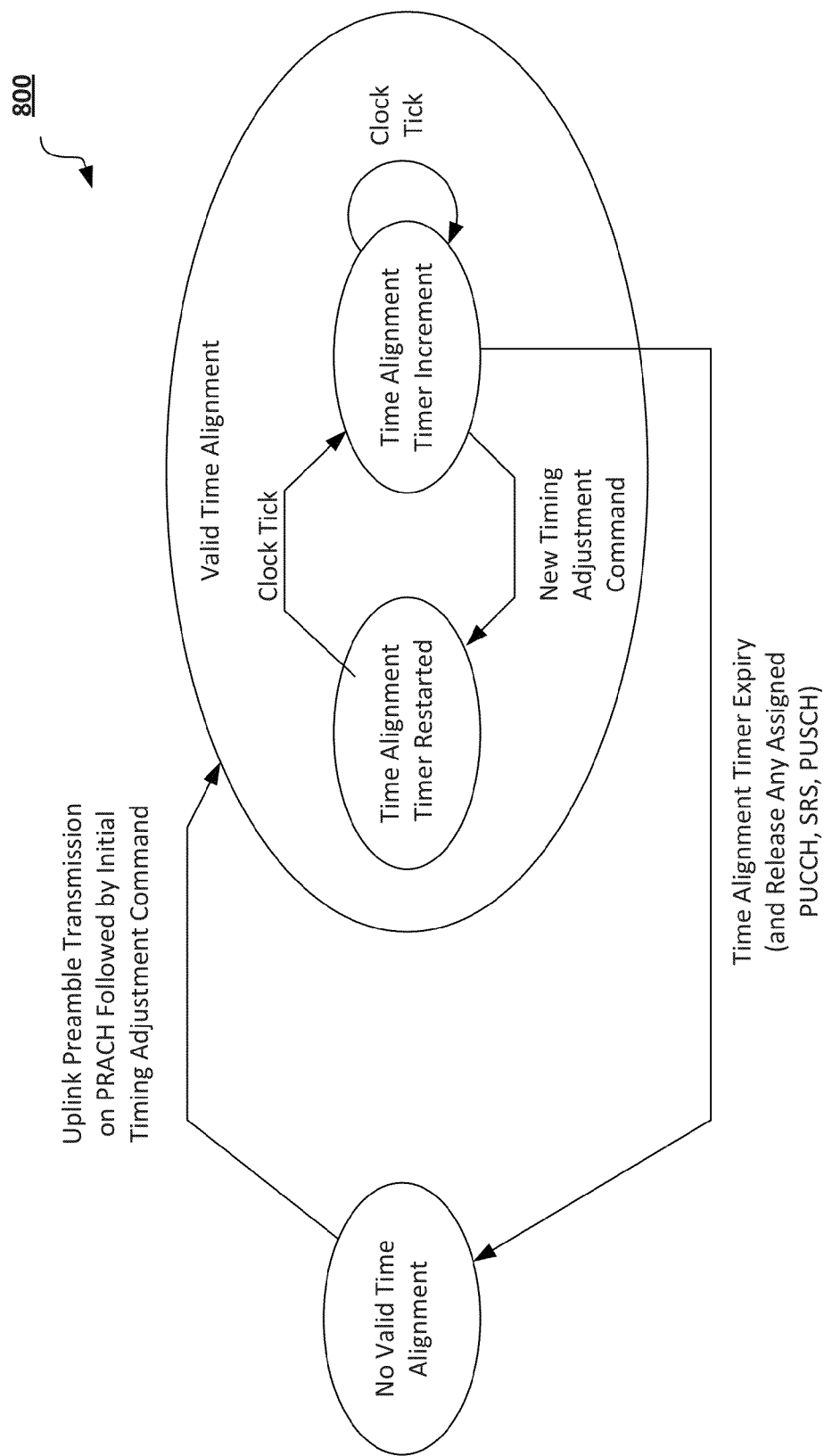
FIG. 8 is a schematic illustrating time alignment between wireless devices and network nodes.

FIG. 8 is a schematic diagram 800 illustrating an overview of the time alignment sub-states as maintained, in some implementations, synchronously by eNB and UE. The expiry threshold for the TAT may be a configurable value which is communicated to the UE. The value may be set and controlled by the eNB and may be defined in Release 8 of the 3GPP standard to be one from the set of {0.5, 0.75, 1.28, 1.92, 2.56, 5.12, 10.24 and Infinity} seconds.

In some embodiments, based on received timing of SRS, CQI, the eNB corrects or adjusts the UE transmission timing by sending TAC MAC CE so that the signal from the UE arrives at the eNB in a certain time window. The eNB may inform the UE of the timer value and the timer is started or restarted by the reception of a timing advance command (TAC).

In some embodiments, if the received downlink timing changes and is not compensated or is only partly compensated by the uplink timing adjustment without timing advance, the UE changes $N_{TA}$ accordingly as specified in 3GPP TS36.133. In another embodiment, the uplink timing can be adjusted partially without TAC MAC CE to maintain the timing error of UE transmission with in a predetermined threshold.

In the context of LTE, a relevant extract of procedural text from 3GPP TS 36.321 is for maintenance of uplink time alignment is:

"The UE shall:
when a Timing Advance Command MAC control element is received:
  apply the Timing Advance Command;
  start or restart timeAlignmentTimer.
when a Timing Advance Command is received in a Random Access Response message:
  if the Random Access Preamble was not selected by UE MAC:
    apply the Timing Advance Command;
    start or restart timeAlignmentTimer.
  else, if the timeAlignmentTimer is not running:
    apply the Timing Advance Command;
    start timeAlignmentTimer;
    when the contention resolution is considered not successful as described in sub clause 5.1.5, stop timeAlignmentTimer.
  else:
    ignore the received Timing Advance Command.
when timeAlignmentTimer expires:
  flush all HARQ buffers;
  notify RRC to release PUCCH/SRS;
  clear any configured downlink assignments and uplink grants.
The UE shall not perform any uplink transmission except the Random Access Preamble transmission when timeAlignmentTimer is not running"

According to the above maintenance procedure of uplink time alignment, upon reception of TAC MAC CE the UE applies the Timing Advance Command and starts or restarts the Time Alignment Timer (TAT). It may be interpreted that a UE in unsynchronised state can be uplink resynchronised by processing TAC MAC CE without performing the random access procedure. However, a UE may not know how to perform uplink timing adjustment based on the TA Command MAC CE and the old uplink timing because the UE may not store the information of old uplink timing after TA timer expiry.

Some Release 8 and 9 UE implementations discard $N_{TA}$ value upon TAT expiry. If TAC MAC CE is applied to such UEs for uplink resynchronisation, the resultant uplink timing may be unreliable. Therefore it was commonly understood that the eNB should avoid applying TAC MAC CE for uplink resynchronisation of Release 8 and 9 UEs.

With respect to release 11 UEs, it is agreed that to add the following note in the 3GPP MAC specification: "A UE stores $N_{TA}$ upon expiry of associated timeAlignmentTimer." "The UE applies a received Timing Advance Command MAC control element and starts associated timeAlignmentTimer also when the timeAlignmentTimer is not running." Thus, the UE should remember the uplink timing upon TAT expiry in order to ensure that uplink timing is reliable after TAC is applied. Three scenarios (shown below) can be identified when TAC MAC CE can be utilized for uplink resynchronization.

Error Recovery Scenario
When TAT is expired because transmission of TAC MAC CE is delayed or missed by the UE, transmitting TAC MAC CE is more efficient than triggering random access procedure to achieve uplink resynchronization. It can be understood that TAC MAC CE should be transmitted by the eNB soon after the eNB detects TAT expiry in the UE.

Small Cell Scenario
In a small cell whose radius is smaller than half a TA step, i.e. roughly 78 meters, then no adjustment is required, i.e. TAT can be set to infinity. For battery saving purposes, TAT can be set to a small value. In this case uplink control signal transmission will be stopped upon TAT expiry, in such a case TAC MAC CE with value of 31 (no adjustment) can be used to resynchronise the UE.

Stationary UE Scenario:
Uplink timing adjustment is not required when the UE is stationary.

According to section 7.1.2 of 3GPP TS36.133, the UE initial transmission timing error shall be less than or equal to $\pm T_e$ where the timing error limit value $T_e$ is specified in Table 1. This requirement applies when it is the first transmission in a DRX cycle for PUCCH, PUSCH and SRS or it is the PRACH transmission. The reference point for the UE initial transmit timing control requirement can be the downlink timing minus $(N_{TA\_Ref}+N_{TA\ offset}) \times T_s$. The downlink timing may be defined as the time when the first detected path (in time) of the corresponding downlink frame is received from the reference cell. $N_{TA\_Ref}$ for PRACH may be defined as 0. $(N_{TA\_Ref}+N_{TA\ offset})$ (in $T_s$ units) for other channels is the difference between UE transmission timing and the downlink timing immediately after when the last timing advance was applied. $N_{TA\_Ref}$ for other channels is not changed until next timing advance is received.

TABLE 1

| $T_e$ Timing Error Limit | |
| --- | --- |
| Downlink Bandwidth (MHz) | $T_e$ |
| 1.4 | 24 * $T_s$ |
| ≥3 | 12 * $T_s$ |

Note:
$T_s$ is the basic timing unit defined in TS 36.211

When it is not the first transmission in a DRX cycle or there is no DRX cycle, and when it is the transmission for PUCCH, PUSCH and SRS transmission, the UE may be capable of changing the transmission timing according to the received downlink frame except when the timing advance is applied. When the transmission timing error between the UE and the reference timing exceeds $\pm T_e$, the UE may be required to adjust its timing to within $\pm T_e$. The reference timing may be $(N_{TA}+N_{TA\ offset}) \times T_s$ before the downlink timing. In the 3GPP specifications, all adjustments made to the UE uplink timing follow these rules:

1) The maximum amount of the magnitude of the timing change in one adjustment shall be $T_q$ seconds.
2) The minimum aggregate adjustment rate shall be $7*T_s$ per second.
3) The maximum aggregate adjustment rate shall be $T_q$ per 200 ms.

The maximum autonomous time adjustment step $T_q$ is specified in Table 2.

TABLE 2

T_q Maximum Autonomous Time Adjustment Step

| Downlink Bandwidth (MHz) | $T_{q\_}$ |
|---|---|
| 1.4 | $[17.5 * T_s]$ |
| 3 | $[9.5 * T_s]$ |
| 5 | $[5.5 * T_s]$ |
| ≥10 | $[3.5 * T_s]$ |

Note:
$T_s$ is the basic timing unit defined in 3GPP TS 36.211

FIG. 9 is a schematic 900 showing an example of UE transmission timing and $N_{TA}$ adjustment upon received downlink timing changes. Specifically, FIG. 9-a is a timing chart of UE just after a timing advance command (TAC) has been applied, where 902 is received downlink timing and 904 is the reference time. Based on section 4.2.3 of TS 36.213, upon reception of the TAC, the UE may adjust its uplink transmission timing 906 to $(N_{TA}+N_{TA\ offset}) \times T_s$ ahead of the downlink timing 902 and restart TAT. $N_{TA\_Ref}$ is equal to $N_{TA}$ in this case.

When the UE moves towards the cell edge, as shown in FIG. 9-b, the received downlink timing 908 may arrive, say, one time unit, later relative to the downlink timing 902 in FIG. 9-a. According to section 7.1.2 of TS 36.133, the UE is required to adjust its timing to within $\pm T_e$ when the transmission timing error between the UE transmission time 906 and the reference timing 910 exceeds $\pm T_e$. In order to keep the transmission timing error less than or equal to $\pm T_e$, the UE adjusts its transmission timing 912 accordingly where a duration of 914 is the UE transmission timing adjustment. The UE also adjusts the $N_{TA}$ to $N_{TAadjusted}$ according to section 4.2.3 of TS 36.213. The adjustment of $N_{TA}$ value is equal to the amount of the transmission timing error after the transmission timing adjustment which is shown as 916.

When TAT is not running, there is no PUCCH, PUSCH and SRS transmission. Therefore no uplink timing adjustment is performed according to section 7.1.2 of 3GPP TS36.133 and received downlink timing changes is not compensated. The UE may store $N_{TA}$ upon expiry of associated TAT. Following section 4.2.3 of TS36.213, the UE changes $N_{TA}$ accordingly if a downlink timing change is not compensated. It is not clear whether this change should be reflected to the stored $N_{TA}$ as well.

One approach is not changing the stored $N_{TA}$ according to the received downlink timing. However, this approach may increase the uplink timing error when a timing advance command is applied for uplink resynchronization.

Another solution is that the UE may change the stored $N_{TA}$ value according to the received downlink timing as specified in 3GPP TS 36.213. In some embodiments, a UE can store $N_{TA}$ upon expiry of associated timeAlignmentTimer. The UE applies a received Timing Advance Command MAC control element and starts associated timeAlignmentTimer also when the timeAlignmentTimer is not running. The UE may change the stored $N_{TA}$ value based on the received downlink timing changes as defined in TS 36.213.

In another embodiment, a UE may maintain or continue to adjust $N_{TA}$ according to 3GPP TS 36.213 upon expiry of associated timeAlignmentTimer. The UE applies a received Timing Advance Command MAC control element and starts associated timeAlignmentTimer also when the timeAlignmentTimer is not running.

FIG. 9-c is a schematic showing an example time chart with UE uplink timing adjustment with and without changing a stored $N_{TA}$ value. Assume that timeAlignmentTimer expires after FIG. 9-b where the UE has adjusted the transmission timing and adjusted the $N_{TA}$ value to $N_{TAadjusted}$. The UE stores $N_{TAadjusted}$—in this case, $N_{TAstored}=N_{TAadjusted}$. If the UE moves further towards the cell edge, the received downlink timing 920 may arrive one time unit later (in this example) than the downlink timing 908 in FIG. 9-b (though it is understood that the downlink timing may, in general, arrive at a certain amount of time later or earlier, depending on the direction of movement of the UE). The new reference time 922 can be $(N_{TA\_Ref}+N_{TAoffset}) \times T_s$ ahead of the downlink timing 920. At this time, the UE has not adjust transmission timing. However, the UE may further change the $N_{TAadjusted}$ to $N_{TAfurther\_adjusted}$ accordingly based on the new downlink timing 920. Specifically, in this example, the $N_{TAfurther\_adjusted}$ is equal to $N_{TAadjusted}$ plus one time unit—the change in the DL transmission timing—in order to keep the UE transmission timing approximately the same relative to the reference timing 904 upon resumption of uplink synchronization for example by the TAC being applied.

After TAT expiry, the UE does not adjust the transmission timing 924. A transmission timing error between the UE transmission timing 924 and the new reference time 922 is shown as 926. Note that an ideal UE transmission timing with compensation of UE mobility would be 928, two time units ahead of the reference timing 904 upon the TAC being applied in this example. When the UE transmits at the ideal transmission time 928, the signal would arrive within the demodulation window or processing window of the base station or evolved Node B to maintain orthogonality with other transmitting UEs. An uplink timing error between the ideal timing 928 and the UE transmission timing 924 after the UE further adjusts the stored $N_{TA}$ value is shown as 930. However, if the UE merely uses $N_{TAstored}$ without further adjustment, the UE transmission timing may be 932, $(N_{TAstored}+N_{TA\ offset}) \times T_s$ ahead of downlink timing 920. The uplink timing error 934 between the UE transmission timing 932 and the ideal timing 928 is larger than that shown as 930 where the stored timing advance value is adjusted. In one particular example scenario, the error corresponding to the approach without adjustment of the stored timing advance value could be twice as much as the error corresponding to the solution with adjustment of the stored timing advance value. In order to reduce uplink timing error upon applying TAC MAC CE, the UE may adjust stored timing advance value when TAT is not running or when downlink timing change is not compensated. In some implementations, the UE may maintain or may continue to adjust the time advance value upon TAT expires or when downlink timing change is not compensated.

Figure 10:
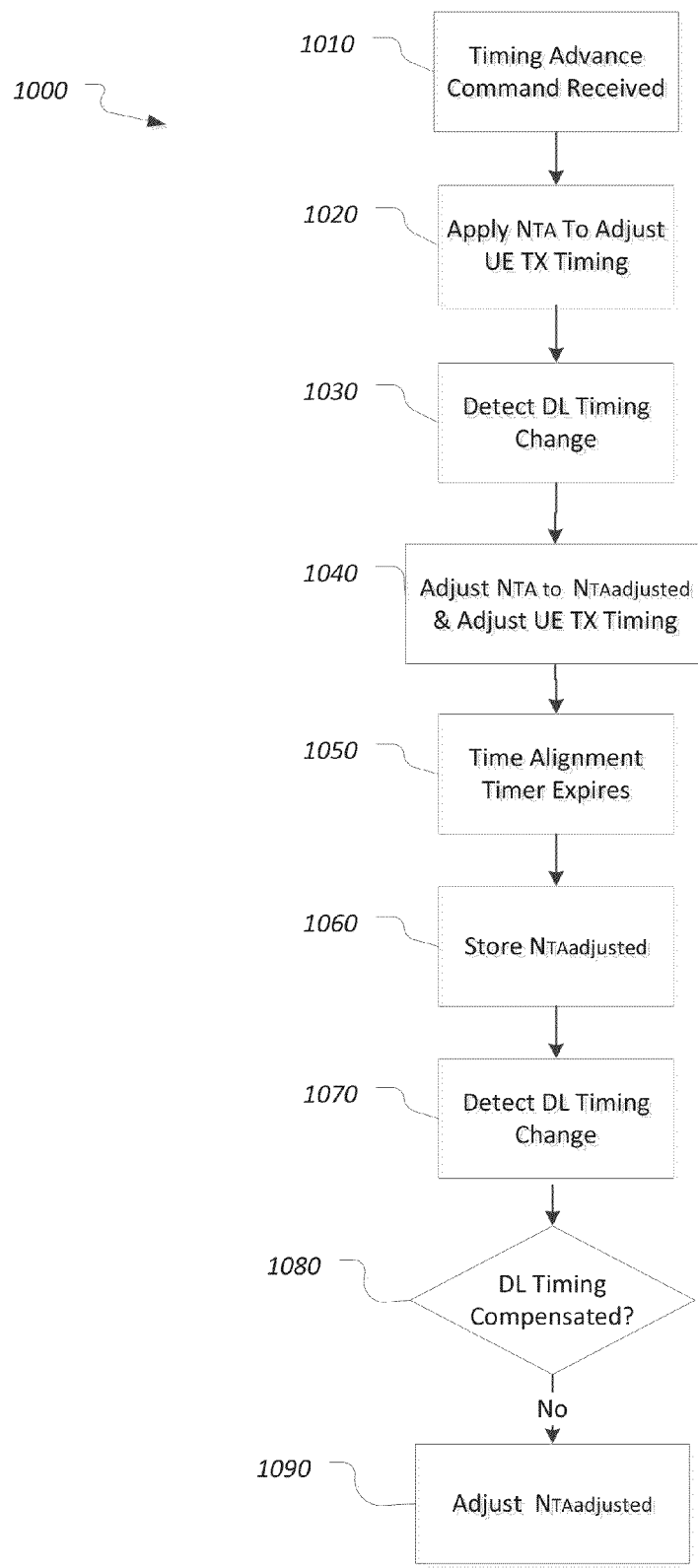
FIG. 10 is a flow chart illustrating an example process for timing advance adjustment upon received downlink timing changes.

FIG. 10 is a flow chart 1000 illustrating an embodiment process in accordance with the above solution for $N_{TA}$ adjustment upon received downlink timing changes. The process may be performed by the UE. Upon the reception of a timing advance command (TAC) (1010), the UE, based on a first $N_{TA}$ value, can apply the timing advance adjustment to the UE uplink transmission timing relative to a downlink timing (1020). In some embodiments, due to UE mobility, the UE may detect that a downlink transmission timing has changed by an amount of time (1030). The UE can change the transmission timing (not shown) and adjust the timing advance accordingly. More specifically the first $N_{TA}$ value to $N_{TAadjusted}$ (1040). When associated TAT expires (1050), the UE can store the current timing advance value $N_{TAadjusted}$ (1060). When the UE detects another change in the downlink transmission timing (1070), if the UE determines that the TAT is not running or the downlink transmission timing change is not compensated for (1080), the UE may not change its transmission timing but further change the stored timing advance value $N_{TAadjusted}$ based on the amount of time that downlink transmission timing has changed (1090).

In order to carry out the above method, the UE, e.g. 300 in FIG. 3, contains a processor capable of performing the above process. For example, the wireless communications subsystem 306 can contain an antenna and a transceiver capable to receive a timing advance command (TAC). The processing module 302 may include one or more processing components. The processing components are operable to, for instance, receive an indication that downlink transmission timing has changed by an amount of time, determine whether a time alignment timer (TAT) is running or not, and adjust a timing advance based on the amount of time that the downlink transmission timing has changed to define an adjusted timing advance. Some processing components may be operable to apply the adjusted timing advance to uplink transmission timing. Certain processing components are related to TAT, for instance, operable to start or restart TAT based on TAC received from the wireless communications subsystem 306, or store the timing advance after expiration of the TAT.

In some aspects of implementations, the TAC might be received in a TAC Medium Access Control (MAC) control element (CE), or in a Random Access (RA) Response (RAR) message.

In this disclosure, "start TAT" may be interpreted as "restart TAT" wherever applicable.

The mobility of UEs relative to eNB (most notably in a radial direction towards or away from the eNB), may change the propagation delay of the transmissions between the UE and the eNB, and hence affects the uplink transmission timing. A metric can be found to provide an easy assessment in determining whether to apply a timing advance command (TAC), specifically, a TAC MAC (medium access control) CE (control element) for uplink resynchronization. The metric may be, for instance, a time limit, a speed limit or a distance limit.

The metric can be derived based on the transmission timing error between the UE uplink transmission time and the reference timing. Recall that in the 3GPP specification, the UE is required to adjust its timing to within $\pm T_e$ when the transmission timing error between the UE and the reference timing exceeds $\pm T_e$.

In some embodiments, a time limit $T_{limit}$, can be considered. The time limit can be the time taken until the uplink transmission error exceeds $\pm T_e$ relative to TAT expiry. $T_{limit}$ can be calculated by the equation (Te*speed of light [m/s])/(UE velocity [m/s]*A) where A is 1 if stored $N_{TA}$ or stored uplink transmission timing is adjusted by the UE, and A is 2 if stored $N_{TA}$ or stored uplink transmission timing is not adjusted by the UE. With the determination of a time limit, the base station or the UE can determine whether to use a timing advance command (TAC) to resume uplink synchronization based on the determined time limit. Specifically, if the elapsed time since the first timing advance command being applied is within the time limit, the base station or the UE can use timing advance command to resume uplink synchronization; and if the elapsed time since the first timing advance command being applied exceeds the time limit, the base station or the UE may decide not to use the timing advance command to resume uplink synchronization. In one example, this capability may be enabled or be disabled by the eNB.

Note that, in some embodiments, the execution of using or not using TAC may be carried out by the base stations. For example, the base station can decide whether to transmit a second TAC to resume uplink synchronization or not. In other embodiments, the execution of using or not using TAC can be carried out by the UE where the UE can decide whether to ignore a second TAC, if any.

In one implementation, Table 3 shows some UE velocity and the corresponding $T_{limit}$, where it is assumed that the UE is moving towards the cell edge or the cell center (base station) and $T_e$ is equal to 12Ts (downlink bandwidth is larger than 1.25 MHz).

TABLE 3

| UE velocity and Time limit | | |
|---|---|---|
| UE Velocity [kph] | $T_{limit}$ with stored $N_{TA}$ adjustment [s] | $T_{limit}$ without UL stored $N_{TA}$ adjustment [s] |
| 3 | 140.53 | 70.26 |
| 15 | 28.11 | 14.05 |
| 30 | 14.05 | 7.03 |
| 42 | 10.04 | 5.02 |
| 100 | 4.22 | 2.11 |
| 180 | 2.34 | 1.17 |
| 360 | 1.17 | 0.59 |

The time limit can relate to a speed limit. For instance, assuming roughly that an eNB would need 10 seconds to detect the UE is not in uplink synchronization and to transmit a TAC MAC CE, a time limit larger than 10 seconds may be needed; otherwise it may not be able to complete the related TAC procedure within the limit. In the example of Table 3, if UE changes the stored timing advance, a UE speed of 40 kph corresponds to a time limit of 10 seconds approximately. If the UE moves faster than 40 kph, there may not be enough time to finish the TAC related procedures within the time limit. Therefore, it is not advisable to use timing advance command (TAC) to resume uplink synchronization in this case, where 40 kph may serve as a speed limit to assess whether to use timing advance command (TAC) to resume uplink synchronization. Analogously, if UE does not change the stored timing advance, a corresponding speed limit would be 20 kph.

Figure 11:
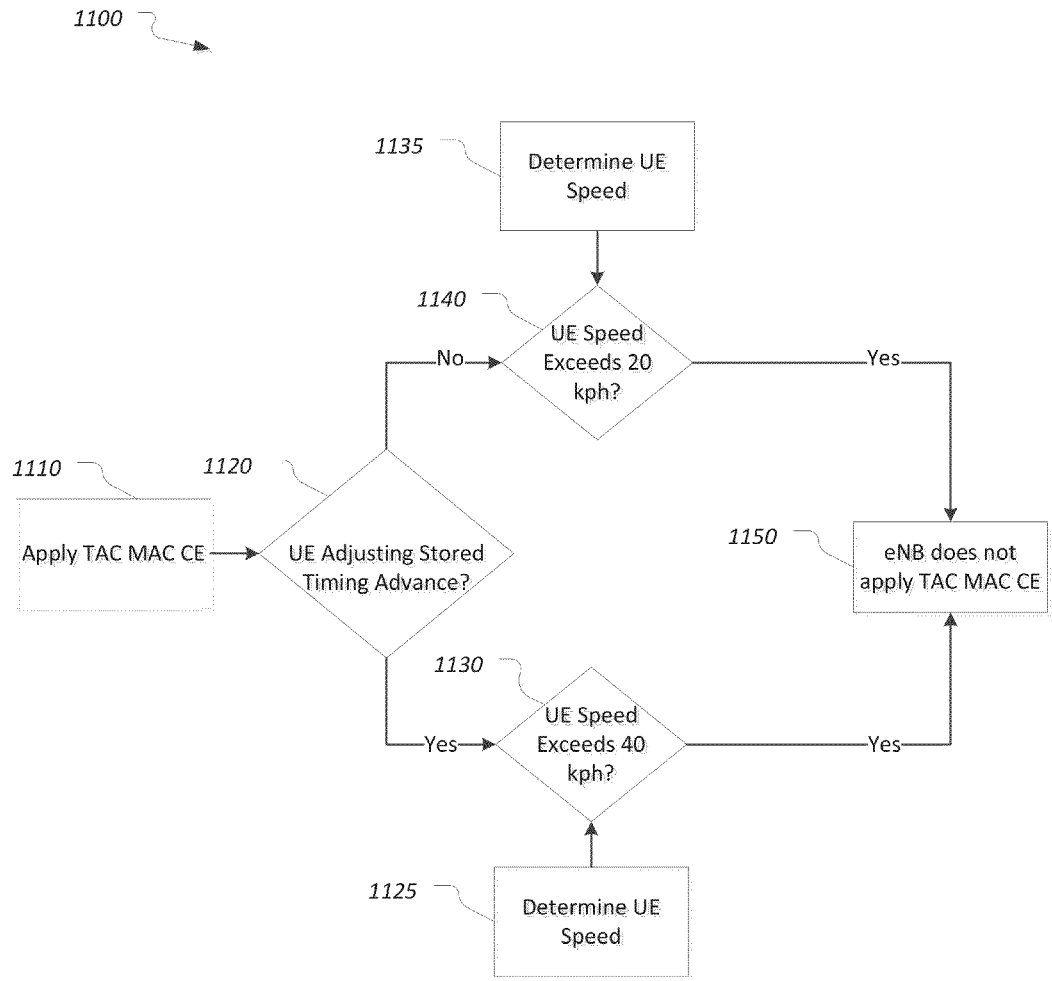
FIG. 11 is a flow chart illustrating an example process for uplink timing maintenance performed by a network node.

FIG. 11 is a flow chart 1100 illustrating an embodiment process in accordance with the above example for uplink timing maintenance. The process may be performed by a network node of a mobile communications network. The network node may be an evolved Node B (eNB) of a communications network, such as a long term evolution (LTE) network, or another network node, described above. The network node can apply a TAC MAC CE for uplink resynchronization (1110). The eNB may indicate a TA value equal to 31 (representing no change to the current timing advance) in the TAC MAC CE since no uplink transmission is available before transmitting TAC. In some instances, if UE changes the stored timing advance (1120), with a determination of the UE speed (1125), the eNB proceeds to decisional step 1130. If the speed of UE exceeds 40, the eNB may not apply TAC MAC CE for uplink timing resynchronization (1150). In some other instances, if UE does not adjust the stored timing advance (1120), the eNB may choose not to apply TAC MAC CE for uplink timing resynchronization (1150) if the estimated UE speed (from step 1135) exceeds 20 kph (1140) because the uplink timing error after the TAC is applied may exceed $\pm T_e$ in this scenario. When the eNB does not have the knowledge on whether the UE is adjusting stored timing advance, the eNB may check only step 1140 to decide whether TAC MAC CE should be applied.

In some aspects of implementations, the determination of UE speed (1125 and 1135) can be performed by the eNB estimating the UE speed. For example, eNB can estimate UE speed based on number of cells the UE has visited per unit of time and cell radius information. In some alternate aspects of implementations, the UE can estimate the speed. More and more UEs are equipped with geo-positioning capability and/ or inertia sensor or accelerometer. By utilizing such capability and sensors, the UE may estimate speed or a range of speed and inform the eNB its speed through uplink signal transmissions. The eNB may determine the UE speed (1125 and 1135) using the mobility indication from the UE.

Figure 12:
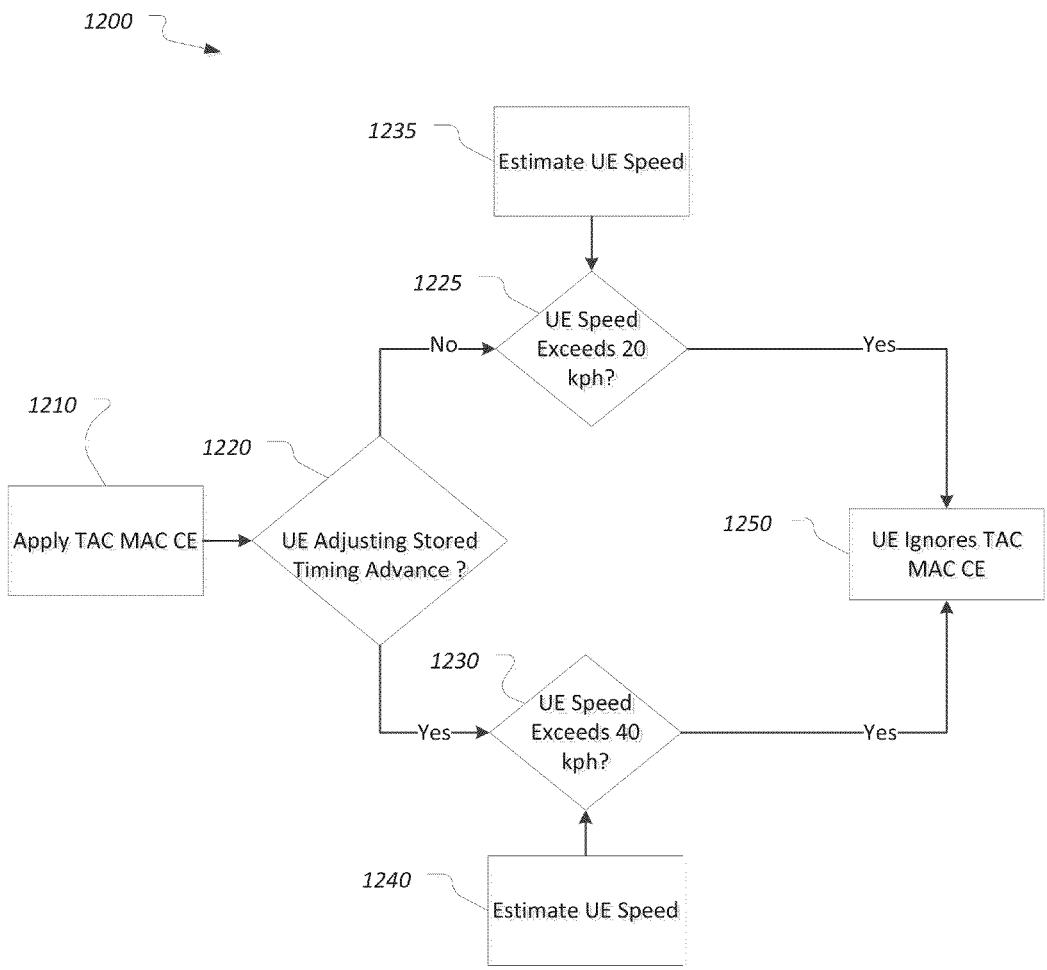
FIG. 12 is a flow chart illustrating an example process for uplink timing maintenance performed by user equipment (UE).

FIG. 12 is a flow chart 1200 illustrating an alternate example process for uplink timing maintenance which may be performed by a user equipment (UE) operating in a wireless communications network. The UE may be a cellular handset, such as a cellular phone or smartphone, or may be a tablet PC, or may be any other user equipment that can communicate with other user equipment in a wireless communications network, such as a long term evolution (LTE) network. Upon applying a first TAC MAC CE (1210), the UE can check whether the UE changes the stored timing advance (1220). The UE can also estimate its speed (1235 and 1240). If the UE does not adjust the stored timing advance and its speed is more than 20 kph (1225), the UE can ignore a second TAC MAC CE, if any (1250). Similarly, if the UE knows it is adjusting the stored timing advance and its speed is more than 40 kph (1230), the UE can ignore a second TAC MAC CE, if any (1250).

In some embodiments, an error margin can be considered for uplink timing maintenance. For instance, when the TAT is expired, there may exist some uplink timing error. Moreover, when the UE velocity (in this disclosure, velocity and speed are used interchangeably) is estimated by the network, the estimation may not be accurate. For example, in macro cell scenario with the existence of some heterogeneous network (Hetnet), the network may estimate the UE speed based on the number of cells in Hetnet which may involve many small cells. There might be some overlaps among smaller cells, or dynamical deployment changes of smaller cells (e.g., femto cell). Such factors may cause error for the UE speed estimation which is based on the number of cells and cell radius information. If the UE speed estimation is based on a more accurate absolute alternative, rather than based on the number of passed cells, an error margin may not be needed.

The consideration of the error margin can help accommodate, for example, possible uplink timing errors and speed estimation errors. By means of example, still assume that an eNB would roughly need 10 seconds to detect the UE is not in uplink synchronization and to transmit a TAC MAC CE. With the consideration of an error margin, a lower speed limit may be required so that the corresponding time limit would be larger than 10 seconds plus a margin. For example, in Table 3, a speed of 30 kph corresponds to a time limit of 14.05 seconds when the UE is applying adjustment of the stored timing advance. This time limit provides a margin of about 4 seconds to accommodate possible uplink timing errors after TAT expiry and speed estimation errors. The same time limit with error margin considered can be achieved with a UE speed of 15 kph given the UE is not changing the stored timing advance.

In some embodiments, the margin may be Te (defined in 3GPP TS 36.133) or 16*Ts or 1 micro second. 16*Ts is a smallest unit of time for uplink timing adjustment. If Te, 16*Ts or some value smaller than equal to 1 micro second is used as the error margin then the eNB or UE decides if TAC MAC CE may be used for uplink resynchronization based on whether subsequent MAC CE is required immediately after the transmission of TAC MAC CE for resuming uplink synchronization. If the subsequent TAC MAC CE needs to be transmitted immediately to correct uplink timing in order to keep the transmitted signal arriving in the processing or demodulation window of the base station or evolved Node B, TAC MAC CE may not be used.

Figure 13:
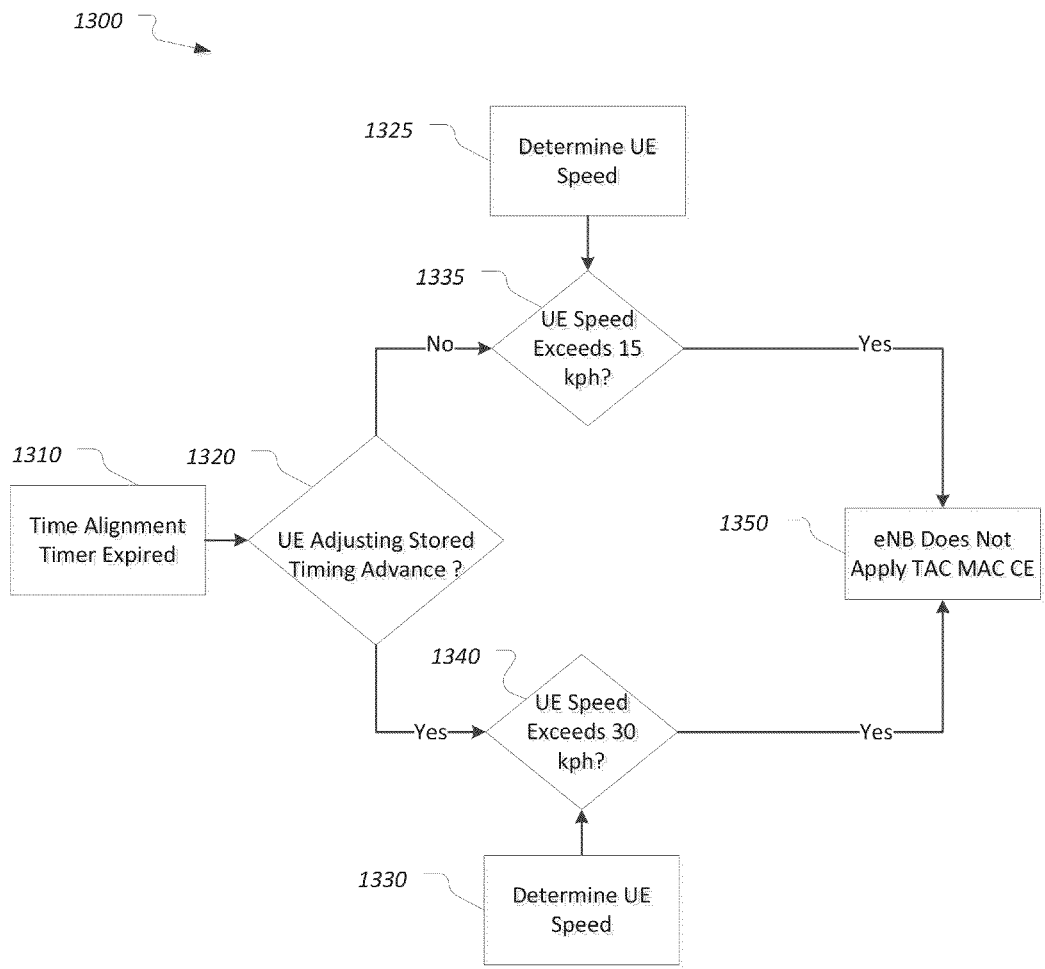
FIG. 13 is a flow chart illustrating an example process for uplink timing maintenance performed by a network node with an error margin considered.

FIG. 13 is a flow chart 1300 illustrating an example process for uplink timing maintenance with an error margin considered. The process may be performed by a network node (e.g., eNB) of a mobile communications network. In this case, upon the expiry of TAT (1310), the eNB can check whether UE is applying the uplink transmission timing adjustment (1320). With the determination of UE speed (1325 and 1340), the eNB may choose not apply TAC MAC CE for uplink timing resynchronization (1350), if the UE speed exceeds 30 kph or 15 kph (1340 or 1335, respectively) based on whether the stored timing advance is changed or not by the UE, respectively. When the eNB does not have the knowledge on whether the UE is adjusting its stored timing advance, the eNB may check only step 1325 to decide whether TAC MAC CE should be applied.

Figure 14:
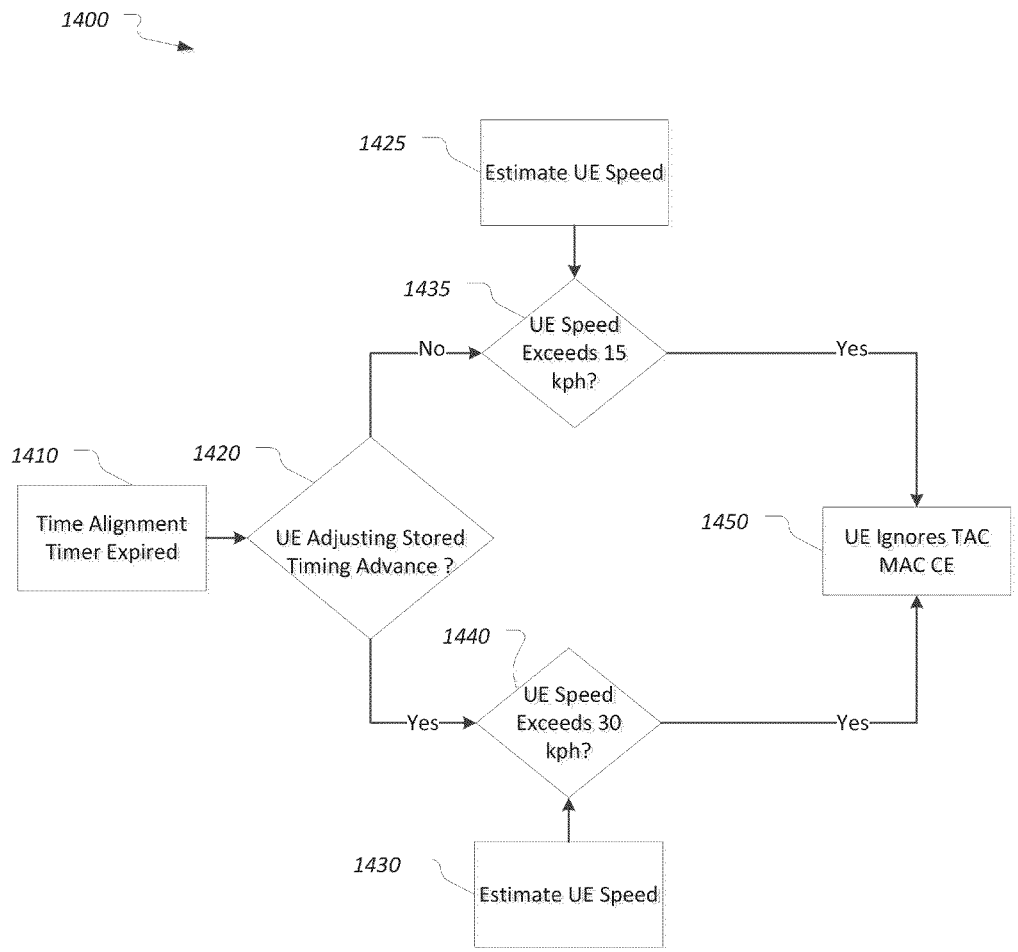
FIG. 14 is a flow chart illustrating an example process for uplink timing maintenance performed by user equipment (UE) with an error margin considered.

FIG. 14 is a flow chart 1400 illustrating another example process for uplink timing maintenance with a consideration of an error margin. The process may be performed by a user equipment (UE) operating in a wireless communications network. In this embodiment, upon the expiry of TAT (1410), the UE can determine whether it is changing the stored timing advance (1420). The UE can further estimates its speed (1425 and 1430) and proceeds to decide whether the estimated UE speed exceeds the speed limit (1435 and 1440). In the case that UE is not adjusting uplink transmission timing, the corresponding speed limit in step 1435 is 15 kph, beyond which the UE may ignore the TAC MAC CE (1450). In another case when UE is changing uplink transmission timing, the UE may ignore the TAC MAC CE if the estimated UE speed exceeds a limit of 30 kph in step 14440.

In some implementations, the time taken to resynchronize an unsynchronized UE (Tresyn) can be considered and estimated by the eNB. Tresyn may include the time taken to detect that the UE is not uplink synchronized (Tdet) and the time taken to schedule and transmit a TAC MAC CE for re-establishing the uplink resynchronization (Tsche). The eNB may also include the retransmission delay, which actually depends on the channel condition of the UE, in the Tsche calculation. For instance, assuming the last reported signal to noise plus interference ratio (SINR) is XdB, from the selected MCS, the average packet error rate could be estimated and then the average number of retransmissions for the TAC MAC CE could be determined which comprises the major part of the Tsche (each retransmission may take 8 ms delay for the FDD system). In another instance, if eNB utilizes robust modulation and coding rate for the transmission of TAC MAC CE, no retransmission delay may be considered.

In some embodiments, if the eNB considers a UE is not in uplink synchronization if the eNB does not receive channel state information (CSI) for a predetermined time. For example Tdet may be an integer multiple of long or short DRX cycle lengths if short or long DRX are configured. In an alternative embodiment, Tdet may be integer multiple of the configured periodicity of CQI/PMI transmissions. The eNB may use an appropriate value for Tsche (Scheduling latency) depending on the traffic load.

If Tresyn is available, the maximum UE velocity [m/s] (or speed limit) can be calculated as (Te*Speed of light [m/s])/ (Tresync*A). If the estimated UE velocity is less than the maximum value, in some embodiments, the eNB may transmit TAC MAC CE at the timing which allows the UE to process the TAC before Tresync passes since the loss of uplink synchronization. In an alternate embodiment, the UE may only process TAC MAC CE if it is received within $T_{limit}$ after TAT expiry.

In some implementations, a distance limit can be considered as a criterion in determining whether TAC MAC CE can be utilized for uplink resynchronization. The distance limit can be a travel distance of the UE since a time alignment timer (TAT) has expired until an uplink transmission error exceeds a timing error limit. In some embodiments, the distance limit can be calculated as (Te*Speed of light [m/s])/(A). If an estimated travel distance of the UE since the TAT has expired is within the distance limit, the timing advance command can be used to resume uplink synchronization; if the estimated travel distance of the UE since the first timing advance command being applied exceeds the time limit, the timing advance command may not be used to resume uplink synchronization. In some embodiments, the execution of using TAC to resume uplink synchronization can be determined by the eNB. For example, the eNB can decide whether to transmit a TAC MAC CE. In other embodiments, the execution of whether to use TAC to resume uplink synchronization can be performed by the UE. For example, the UE can simply ignore the TAC if it decides not to use TAC for uplink transmission timing adjustment.

In some aspects of implementations, the base station can estimate the travel distance of the UE, for instance, based on the UE's registration information with its serving cell, or handover information or based on the angle of arrival (AoA)/Angle of Departure (AoD) information. An error margin can also be considered in certain embodiments. In an alternate aspect of implementations, the UE can estimate its travel distance, for example, by utilizing GPS or some sensors with geo-positioning capability.

In some embodiments, the UE may indicate the estimation of its velocity or travel distance if requested by the network. Specifically, the UE may estimate speed/distance or a range of speed/distance and indicate the information to the eNB in RRC messages (e.g. RRC connection setup complete, RRC connection reestablishment, RRC connection reconfiguration complete, Measurement report) or a new MAC CE.

Figure 15:
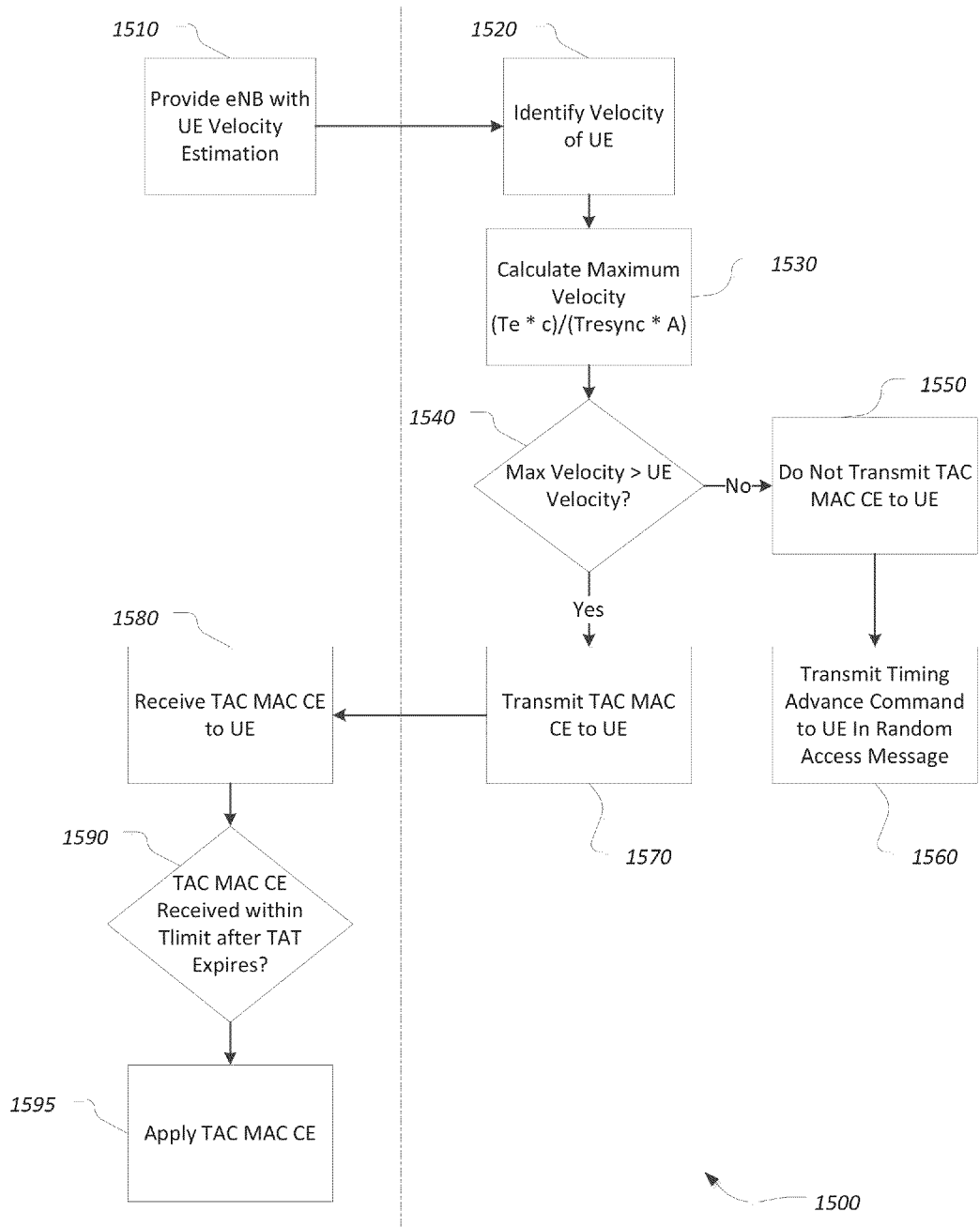
FIG. 15 is a flow chart illustrating an example process for uplink timing maintenance with a speed limit considered.

FIG. 15 is a flow chart 1500 illustrating an example process for uplink timing maintenance in a wireless communications network. The UE may provide the speed estimation to eNB (1510). Based on the identified UE speed (1520), the eNB may calculate the speed limit as (Te*Speed of light [m/s])/(Tresync*A) at step 1530. If the UE speed is found to be beyond the speed limit (1540), the eNB may not transmit TAC MAC CE (1550) and proceed to trigger a random access procedure and transmit TAC in a random access response (1560). If the estimated UE speed is determined to be lower than the speed limit (1540), the eNB can transmit TAC MAC CE (1570). Upon the receiving of TAC MAC CE from the eNB (1580), the UE may determine whether the TAC MAC CE is received within time limit (1590). If $T_{limit}$ has not passed since the TAT expiry, the UE may apply the TAC MAC CE for uplink time resynchronization (1595).

Note that the abovementioned procedures can be applied to distance limit with corresponding distance estimation as well.

Figure 16:
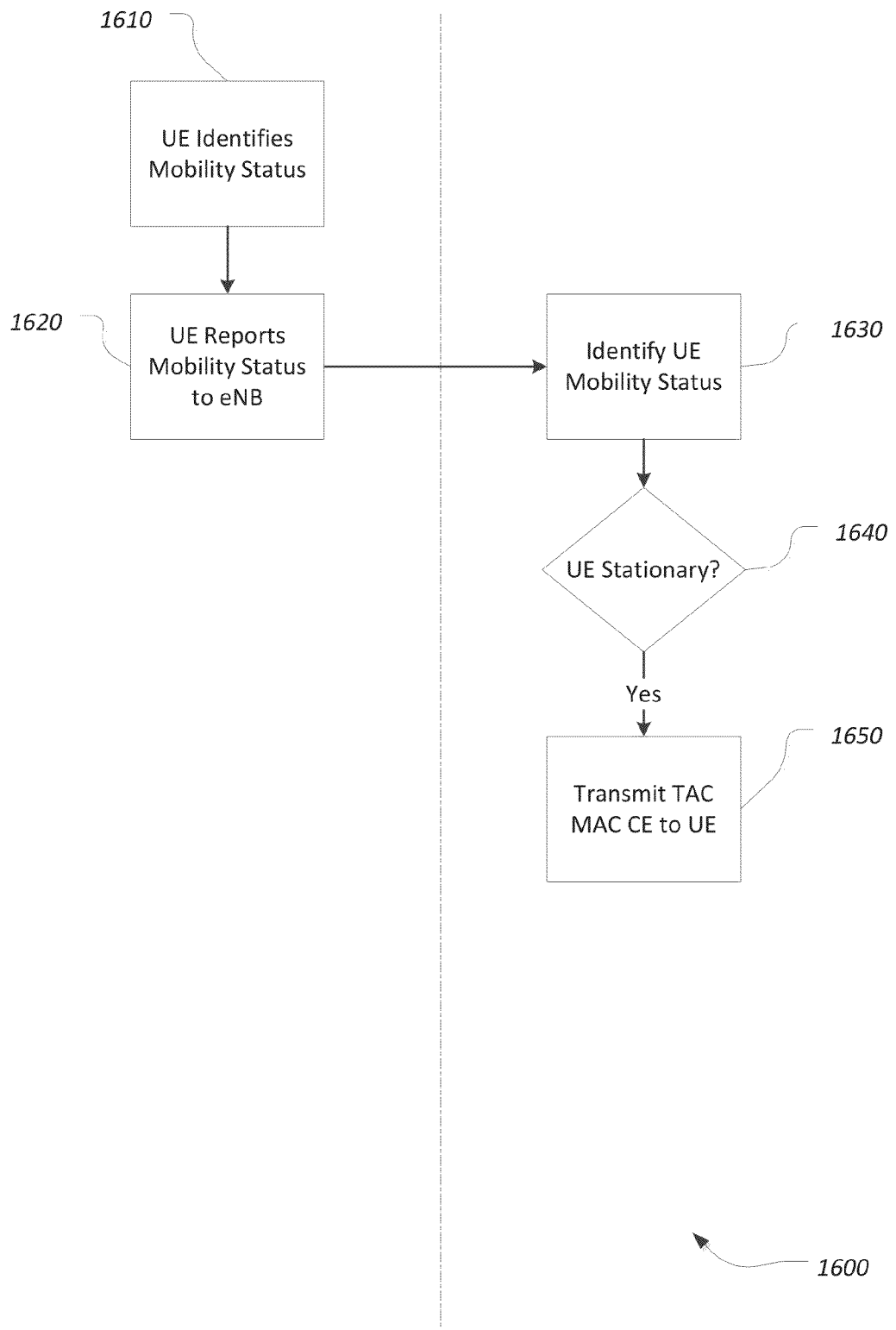
FIG. 16 is a flow chart illustrating an example process for uplink timing maintenance with a mobility status considered.

FIG. 16 is a flow chart 1600 illustrating another example process for uplink timing maintenance in a wireless communications network. In this example, either by speed estimator or by handover detector, the UE may identify its mobility status (1610) which may include an indication whether the UE is stationary or not. In some aspects of implementations, multiple mobility states can be defined and included in the mobility status. The UE can identify which state it is in. The UE can report the mobility state periodically or when requested to the network for the uplink time alignment purpose (1620). In some embodiments, the UE may send a stationary indicator or a mobility state to the network in Layer 1 (physical layer) or Layer 2 (MAC layer) signaling. Mobility status indication may be defined as a new MAC CE or indicated over the dedicated layer 1 channel. By receiving and identifying the mobility indicator (1630), the eNB may determine how to send the MAC TAC CE. In some embodiments, the eNB can determine whether the UE is stationary (1640) via various positioning means such as the finger print information. If so, the eNB may send the MAC TAC CE to the UE very infrequently (1650), and/or adjust the TAT timer in a much longer period. In an alternate aspect of implementation, even though the TAT timer expires, the network may continue to use MAC TAC CE to adjust the uplink timing when stationary indicator is received. In one example, the expiration value of the TAT timer can be set to a very large value, even to infinity. In this case, the uplink control signal transmission should be controlled carefully in order to reduce the control overhead and save the UE battery. In another example, the expiration value of the TAT timer can be set to a very small value. Thus the uplink control signaling can be avoided when the TAT timer expires.

Figure 17:
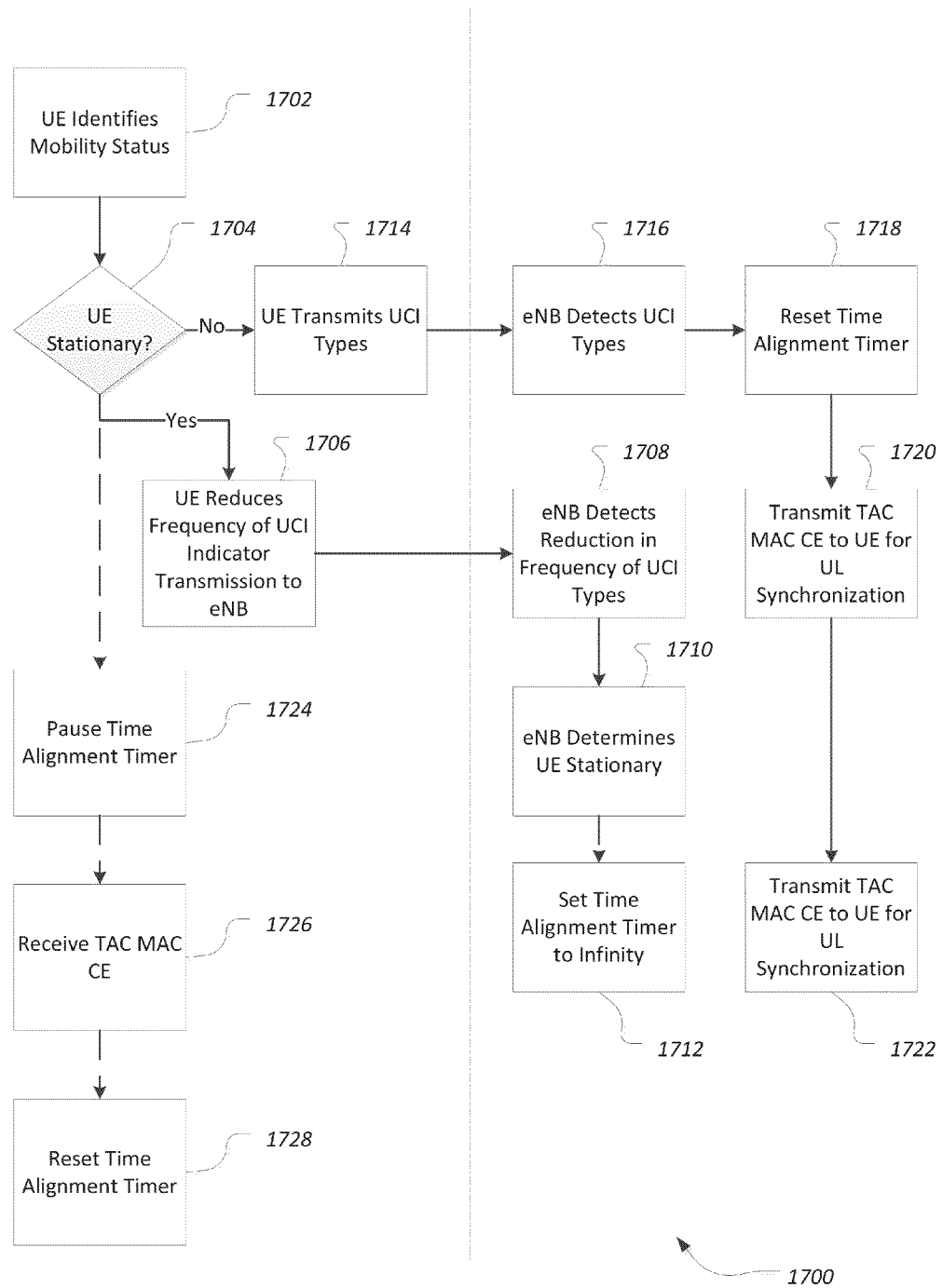
FIG. 17 is a flow chart illustrating an example process for uplink timing maintenance with a mobility status considered.

FIG. 17 is a flow chart 1700 illustrating another example process for uplink timing maintenance in a wireless communications network. The UE can identify its mobility status (1702). If the UE is stationary, for instance, the user of the UE is in a building. By determining the UE is stationary in step 1704, the UE may reduce the frequency of certain uplink control information (UCI) transmission to eNB (1706). In some implementations, the UE may choose not to transmit certain uplink control information (UCI) types in long DRX if the UE detects stationary status. The UE may choose to transmit the UCI in long DRX at every N on duration period if the UE detects stationary status. N may be 2 to infinite number. N may be predetermined or configured by the network, for example via system information or a RRC connection reconfiguration message. If the UE is stationary and little traffic is serviced for the UE, the uplink control signal is not used or required by the network.

Possible Uplink Control Information (UCI) types may include: CQI (Channel Quality Indicator); PMI (Precoding Matrix Indicator); PTI (Precoding Type Indicator); RI (Rank Indicator); DSR (Dedicated Scheduling Request); SRS (Sounding Reference Signal); and/or others. The UCI transmissions require an assignment of physical radio resource (e.g. time/frequency/code) on which they may be transmitted.

If the network detects that the UE does not transmit certain uplink control information (UCI) for a predetermined duration or a configured timing (1708), in some embodiments, the network may determine that the UE is in the stationary condition (1710) and may utilize TAC MAC CE for uplink resynchronization (1712). In an alternate embodiment, the network may configure TAT value to infinity (not shown). When the UE starts to move, the UE may detect the stationary state no long holds (1704). The UE may need to report the UCI again in every on duration period (1714) and the network may be aware that from the detection of the UCI (1716). Then the network may reconfigure the TAT value (1718) and start transmitting the TAC MAC CE periodically (1720 and 1722). In another embodiment, when the UE is in the stationary condition, the TAT timer may be paused (1724) and never expired from the UE side. When the UE starts the uplink transmission or receives the TAC MAC CE (1726), the timer may start again (1728).

In one embodiment, the frequency of transmitting UCI when stationary state is detected may be indicated as a part of MAC-mainconfig information element (IE) included in RRC connection reconfiguration message. The new element may indicate the frequency of CSI/PMI/PTI/RI or SRS and can be denoted as uci-FrequencyStational. When the UE receives uci-FrequencyStational, the UE reports SCI/PMI/PTI/RI or SRS every uci-FrequencyStational times a long DRX cycle.

In addition to uci-FrequencyStational, uci-OffsetStational may be indicated. uciOffsetStational indicates which indicates which on duration period is used to transmit UCI. An example MAC-mainconfig includes uci-FrequencyStational field is shown as below (new text is in underlined italics):

DurationTimer is running, and uci-FrequencyStational is configured by upper layer, and the UE detects stationary state, and the long DRX cycle is used, and there is no on-going data transmission or retransmission, and this on-duration period does not satisfy uci-FrequencyStational.

```
-- ASN1START
MAC-MainConfig ::=           SEQUENCE {
    ul-SCH-Config              SEQUENCE {
        maxHARQ-Tx               ENUMERATED {
                                   n1, n2, n3, n4, n5, n6, n7, n8, n10,
                                   n12, n16,n20, n24, n28, spare2,
                                   spare1} OPTIONAL, -- Need ON
        periodicBSR-Timer        ENUMERATED {
                                   sf5, sf10, sf16, sf20, sf32, sf40, sf64,
                                   sf80, sf128, sf160, sf320, sf640,
                                   sf1280, sf2560, infinity,
                                   spare1} OPTIONAL, -- Need ON
        retxBSR-Timer            ENUMERATED {
                                   sf320, sf640, sf1280, sf2560, sf5120,
                                   sf10240, spare2, spare1},
        ttiBundling              BOOLEAN
    }                                  OPTIONAL, -- Need ON
    drx-Config              DRX-Config     OPTIONAL, -- Need ON
    timeAlignmentTimerDedicated TimeAlignmentTimer,
    phr-Config                     CHOICE {
        release                      NULL,
        setup                        SEQUENCE {
            periodicPHR-Timer          ENUMERATED{sf10, sf20, sf50,
                                         sf100, sf200, sf500, sf1000,
                                         infinity},
            prohibitPHR-Timer          ENUMERATED {sf0, sf10, sf20,
                                         sf50, sf100, sf200, sf500,
                                         sf1000},
            dl-PathlossChange          ENUMERATED {dB1, dB3, dB6,
                                         infinity}
        }
    }                              OPTIONAL, -- Need ON
...,
[[  sr-ProhibitTimer-r9         INTEGER (0..7)
OPTIONAL -- Need ON
]],
[[  mac-MainConfig-v1020        SEQUENCE {
        sCellDeactivationTimer-r10 ENUMERATED {
                                     rf2, rf4, rf8, rf16, rf32, rf64,
                                     rf128, spare}
                                     OPTIONAL, -- Need OP
        extendedBSR-Sizes-r10      ENUMERATED {setup}
                                     OPTIONAL, -- Need OR
        extendedPHR-r10            ENUMERATED {setup}
                                     OPTIONAL -- Need OR
    }                              OPTIONAL -- Need ON
]],
[[  mac-MainConfig-v1x          SEQUENCE {
        uci-Frequencystational     ENUMERATED {2, 3, 4, 5, 10,
                                     infinite}
    }                              OPTIONAL-- Need ON
]]
}
```

In some embodiments, when DRX mode is configured, an example method may be performed by a user equipment (UE) operating in a wireless communications network can include not reporting sounding reference signal (SRS), for example, type-0-triggered SRS as defined in 3GPP TS 36.213, when not in Active Time; or in Active Time and uci-FrequencyStational is configured by upper layer, and the UE detects stationary state, and on DurationTimer is running, and the long DRX cycle is used, and there is no on-going data transmission or retransmission, and this on-duration period of the DRX cycle does not satisfy uci-FrequencyStational.

In some embodiments, with DRX mode configured and a feature (named "CQI masking") setup by upper layers, the UE may not report one or more of CQI/PMI/RI/PTI on PUCCH when on DurationTimer is not running; or when on In some embodiments, when DRX mode is configured, the UE may not report CQI/PMI/RI/PTI on PUCCH if CQI masking (cqi-Mask) is not setup by upper layers and when: not in Active Time; or in Active Time and uci-FrequencyStational is configured by upper layer and the UE detects stationary state, and on DurationTimer is running, and the long DRX cycle is used, and there is no on-going data transmission or retransmission, and this on-duration period does not satisfy uci-FrequencyStational.

Other scenarios may exist which allow the eNB applies TAC MAC CE for resynchronization. One example is that the eNB detects that the UE stays in a cell more than a predetermined time. In alternate examples, broadcast or dedicated RRC signaling could be used to instruct UEs what to do if they receive a TAC MAC CE when the TAT is expired. Upon the reception of the TAC MAC CE and the instructions, the UE can choose from the following options:

- UE always applies TAC and restarts TAT.
- UE only applies TAC and restarts TAT if less than a specified time has elapsed since TAT expiry.
- UE only applies TAC and restarts TAT if UE velocity is less than a specified value.
- UE only applies TAC and restarts TAT if UE travel distance is less than a specified value.
- UE does not apply TAC, but initiates a random access procedure instead.

Various combinations of the above conditions could also exist.

In some embodiments, the TAC MAC CE can be applied for uplink resynchronization if subsequent transmission of TAC MAC CE is not required immediately. In accordance with the proposal, the following note can be added to the 3GPP specifications:

A UE stores NTA upon expiry of associated timeAlignmentTimer. The UE applies a received Timing Advance Command MAC control element (TAC MAC CE) and starts associated timeAlignmentTimer also when the timeAlignmentTimer is not running. Use of TAC MAC CE for uplink resynchronization is allowed if transmission of subsequent TAC MAC CE is not required immediately.

In order to carry out the above method, the base station, e.g. the network node 200 in FIG. 2, and the UE, e.g. UE apparatus 300 in FIG. 3 contain processors capable of performing the above process. For example, the wireless communications subsystem 206 of the base station can contain an antenna and a transceiver capable to send downlink control information and receive uplink control information. The wireless communications subsystem 306 of the UE can contain an antenna and a transceiver capable to transmit uplink control information and receive downlink control information. The downlink control information may include, for example, a time advance command (TAC); and instructions of how to process TAC when a Time Alignment Timer (TAT) is expired. The uplink control information may include, for example, an indication of UE speed or mobility status, or CSI/PMI/PTI/RI or SRS.

The processing module 202 of the base station and the processing unit 302 of the UE may include one or more processing components. The processing components are operable to, for instance, configure certain transmission or reception mode, determine a time limit, speed limit or distance limit, and determine whether to use TAC to resume uplink synchronization. Some processing components are operable to estimate the UE speed or mobility status, determine if the UE stays in one cell for more than a predetermined time, and configure control information based on the UE speed or mobility status or staying time of the UE in the cell.

Certain processing components are related to TAT, for instance, determine whether a time alignment timer (TAT) is running or not, start or restart TAT based on TAC or related instructions, or store the time advance after expiration of the TAT.

In some aspects of implementations, the TAC might be received in a TAC Medium Access Control (MAC) control element (CE), or in a Random Access (RA) Response message.

In this disclosure, "start TAT" may be interpreted as "restart TAT" wherever applicable.

While several implementations have been provided in the present disclosure, it should be understood that the disclosed systems and methods may be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various implementations as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

While the above detailed description has shown, described, and pointed out the fundamental novel features of the disclosure as applied to various implementations, it will be understood that various omissions and substitutions and changes in the form and details of the system illustrated may be made by those skilled in the art, without departing from the intent of the disclosure. In addition, the order of method steps not implied by the order they appear in the claims.

A method for controlling uplink transmission timing of a wireless communications network, the network comprising a base station and a User Equipment (UE), the method comprising applying a timing advance command to adjust uplink transmission timing; determining a time limit, the time limit identifying an amount of time elapsed, relative to an expiration of a time alignment timer (TAT), until an uplink transmission error exceeds a timing error limit; and determining whether to use a second timing advance command to resume uplink synchronization based on the determined time limit.

If the elapsed time since the first timing advance command being applied is within the time limit, using timing advance command to start TAT; and if the elapsed time since the first timing advance command being applied exceeds the time limit, refraining from using the timing advance command to resume uplink synchronization.

The uplink transmission error is a timing difference between the uplink transmission timing and a reference timing, wherein the reference timing can be an amount of time prior to a downlink timing and the amount of time to keep transmission from the UE arriving within processing or demodulation window of a base station. The amount of time includes an amount of time to compensate for UE mobility. A downlink timing is defined as the time when the first detected path in time of a corresponding downlink frame is received by the user equipment.

The time limit can be calculated based on the timing error limit value, the speed of light, a speed of the user equipment and whether a stored timing advance is adjusted by the user equipment or where a timing advance is adjusted when TAT is not running.

Identify a speed of the user equipment, determine a speed limit of the user equipment; and determine whether to use timing advance command to resume uplink synchronization based on the determined speed limit and the estimated speed of the user equipment. Use a timing advance command to resume uplink synchronization if the estimated speed of the user equipment is lower than the speed limit of the user equipment; and do not use a timing advance command to resume uplink synchronization if the estimated speed of the user equipment exceeds the speed limit of the user equipment.

A consideration of an error margin of the speed estimation of the user equipment can be made. The speed limit of the user equipment can be calculated based on the timing error limit value, the speed of light, whether the stored timing advance is adjusted by the user equipment or timing advance is adjusted when TAT is not running, and a resynchronization time, the resynchronization time is the time taken to resynchronize an unsynchronized user equipment.

The resynchronization time may comprise a detection time which is the time taken to detect that the user equipment is not uplink synchronized; and a scheduling time which is the time taken to schedule and transmit a timing advance command for re-establishing uplink synchronization. The scheduling time may further comprise a retransmission delay.

The speed estimation can be done by the network based on number of cells UE has visited per unit of time and cell radius information. The user equipment can use its geo-positioning capability and/or inertia sensor or accelerometer to estimate the speed or a range of speed of the user equipment.

The user equipment can send the network a mobility status indicator. The base station can determine how to apply the timing advance command based on the mobility indicator.

The base station can determine a frequency of sending a timing advance command (TAC) medium access control (MAC) control element (CE) based on the mobility status indicator of the user equipment. The base station can determine a value of a time alignment timer (TAT) based on the mobility status indicator of the user equipment.

A method for controlling uplink transmission timing of a wireless communications network, the network comprising a base station and a User Equipment (UE), the method comprises determining a distance limit; and determining whether to use the timing advance command to resume uplink synchronization based on the determined distance limit.

The timing advance command is used to resume uplink synchronization if a travelled distance of the UE since the TAT has expired is within the distance limit; and The timing advance command is refrained from being used to resume uplink synchronization if the travelled distance of the UE since the first timing advance command being applied exceeds the time limit. The distance limit can be calculated based on a timing error limit value, the speed of light, and whether the stored timing advance is adjusted by the user equipment or timing advance is adjusted when TAT is not running.

The travel distance of the user equipment can be estimated; and it can be determined whether to use timing advance command to resume uplink synchronization based on the determined distance limit and the estimated travelled distance of the user equipment.

The method further comprises using timing advance command to resume uplink synchronization if the estimated travelled distance of the user equipment is smaller than the distance limit of the user equipment; and refraining from using timing advance command to resume uplink synchronization if the estimated travelled distance of the user equipment is larger than or equal to the distance limit of the user equipment.

The distance limit identifies a travel distance of the UE since a time alignment timer (TAT) has expired until an uplink transmission error exceeds a timing error limit A method for controlling uplink transmission timing of a wireless communications network, the method comprises, at a User Equipment (UE): detecting a mobility status of the UE; and configuring the frequency of transmitting one or more Uplink Control Information (UCI) types to a predetermined value; and at the base station: determining the frequency of receiving the one or more UCI types; and determining the mobility status of the UE based on the frequency of receiving the one or more UCI types.

The method further comprises determining how to apply the timing advance command based on the frequency of receiving of the one or more UCI types. The one or more UCI types include one or more of channel state information (CSI), a precoding matrix index (PMI), a precoding type indicator (PTI), a rank indicator (RI), or a sounding reference signal (SRS).

The predetermined value of the frequency of the one or more UCI types may be indicated as a field of a MAC-mainconfig information element included in RRC connection reconfiguration message, wherein the field is denoted by uci-FrequencyStational. The method further comprises: at the UE: receiving the uci-FrequencyStational information element; and configuring the frequency of transmitting one or more UCI types to be uci-FrequencyStational times a long DRX cycle.

When DRX is configured, refrain from transmitting sounding reference signal (SRS) when the following conditions are met: not in Active Time; or in Active Time, uci-FrequencyStational is configured by upper layer, the UE detects stationary state, and on DurationTimer is running, a long discontinuous reception (DRX) cycle is used, and an on-duration period of the DRX cycle does not satisfy uci-FrequencyStational.

When discontinuous reception (DRX) mode is configured, refrain from reporting one or more of CQI/PMI/RI/PTI on PUCCH if channel quality indicator masking (cqi-Mask) is setup by upper layers when: on DurationTimer is not running; or on DurationTimer is running, when uci-FrequencyStational is configured by upper layer and the UE detects stational state, a long DRX cycle is used, and an on-duration period of the DRX mode does not satisfy uci-FrequencyStational.

When discontinuous reception (DRX) mode is configured, refrain from reporting CQI/PMI/RI/PTI on PUCCH if CQI masking (cqi-Mask) is not setup by upper layers and when: not in Active Time; or in Active Time, when uci-FrequencyStational is configured by upper layer and the UE detects stational state, an on DurationTimer is running, a long DRX cycle is used, and an on-duration period of the DRX mode does not satisfy uci-FrequencyStational.

A method for controlling uplink transmission timing of a wireless communications network, the network comprising a base station and a User Equipment (UE), the method comprising: at the base station in communication with the UE: applying a Timing Advance Command (TAC) Medium Access Control (MAC) Control Element (CE) for resuming uplink synchronization; and sending instruction to the UE if the UE processes TAC MAC CE when a Time Alignment Timer (TAT) is expired.

The instruction is included in broadcast or dedicated Radio Resource Control (RRC) signaling. The UE applies TAC and restart the TAT. In some circumstances, the UE applies TAC and restarting TAT if less than a specified time has elapsed since TAT expiry. The UE applies TAC and restarting TAT if UE speed is less than a specified value. The UE applies TAC and restarting TAT if UE travel distance is less than a specified value. The UE does not apply TAC and initiating a random access procedure instead.

A User Equipment (UE) of a wireless communications network, for controlling uplink transmission timing, the UE being operable to: apply a first timing advance command to adjust uplink transmission timing; determine a time limit, the time limit identifies an amount of time elapsed, relative to an expiration of a time alignment timer (TAT), until an uplink transmission error exceeds a timing error limit; and determine whether to use timing advance command to resume uplink synchronization based on the determined time limit. If the elapsed time since the first timing advance command being applied is within the time limit, use timing advance command to resume uplink synchronization; and if the elapsed time since the first timing advance command being applied exceeds the time limit, refrain from using the timing advance command to resume uplink synchronization.

The amount of time includes an amount of time to compensate for UE mobility.

A downlink timing is defined as the time when the first detected path in time of a corresponding downlink frame is received by the user equipment. The time limit can be calculated based on the timing error limit value, the speed of light, a speed of the user equipment and whether a stored timing advance is adjusted by the user equipment or timing advance is adjusted when TAT is not running.

The UE is further operable to: estimate a speed of the user equipment; determine a speed limit of the user equipment; and determine whether to use timing advance command to resume uplink synchronization based on the determined speed limit and the estimated speed of the user equipment.

The UE is further operable to: apply timing advance command to resume uplink synchronization if the estimated speed of the user equipment is lower than the speed limit of the user equipment; and ignore timing advance command to resume uplink synchronization if the estimated speed of the user equipment exceeds the speed limit of the user equipment.

The calculation of the time limit can incorporate a consideration of an error margin of the speed estimation of the user equipment. The speed limit of the user equipment can be calculated based on the timing error limit value, the speed of light, whether the stored timing advance is adjusted by the user equipment or timing advance is adjusted when TAT is not running, and a resynchronization time, the resynchronization time is the time taken to resynchronize an unsynchronized user equipment.

The resynchronization time may comprise a detection time which is the time taken to detect that the user equipment is not uplink synchronized; and a scheduling time which is the time taken to schedule and transmit a timing advance command for re-establishing uplink synchronization. The scheduling time may further comprise a retransmission delay.

The UE is further operable to use its geo-positioning capability and/or inertia sensor or accelerometer to estimate the speed or a range of speed of the user equipment. The UE is further operable to send the network a mobility status indicator.

A base station of a wireless communications network, for controlling uplink transmission timing, the base station being operable to: apply a first timing advance command to adjust uplink transmission timing; determine a time limit, the time limit identifies an amount of time elapsed, relative to an expiration of a time alignment timer (TAT), until an uplink transmission error exceeds a timing error limit; and determine whether to use timing advance command to resume uplink synchronization based on the determined time limit.

The base station is further operable to: if the elapsed time since the first timing advance command being applied is within the time limit, use timing advance command to resume uplink synchronization; and if the elapsed time since the first timing advance command being applied exceeds the time limit, refrain from using the timing advance command to resume uplink synchronization.

The uplink transmission error is a timing difference between the uplink transmission timing and a reference timing, wherein the reference timing can be a predetermined amount of time prior to a downlink timing and the predetermined amount of time includes an amount to compensate UE mobility. A downlink timing is defined as the time when the first detected path in time of a corresponding downlink frame is received by the user equipment. The time limit can be calculated based on the timing error limit value, the speed of light, a speed of the user equipment and whether the stored timing advance is adjusted by the user equipment or timing advance is adjusted when TAT is not running.

The base station is further operable to: identify a speed of the user equipment; determine a speed limit of the user equipment; and determine whether to use timing advance command to resume uplink synchronization based on the determined speed limit and the estimated speed of the user equipment.

The base station is further operable to: apply timing advance command to resume uplink synchronization if the estimated speed of the user equipment is lower than the speed limit of the user equipment; and refrain from applying timing advance command to resume uplink synchronization if the estimated speed of the user equipment exceeds the speed limit of the user equipment.

The calculation of the time limit can incorporate a consideration of an error margin of the speed estimation of the user equipment. The speed limit of the user equipment can be calculated based on the timing error limit value, the speed of light, whether the stored timing advance is adjusted by the user equipment or timing advance is adjusted when TAT is not running, and a resynchronization time, the resynchronization time is the time taken to resynchronize an unsynchronized user equipment.

The resynchronization time may comprise a detection time which is the time taken to detect that the user equipment is not uplink synchronized; and a scheduling time which is the time taken to schedule and transmit a timing advance command for re-establishing uplink synchronization. The scheduling time may further comprise a retransmission delay.

The speed estimation can be done by the network based on number of cells UE has visited per unit of time and cell radius information. The speed estimation can be done by the use equipment and the user equipment sends the network a mobility status indicator.

The base station is further operable to determine how to apply the timing advance command based on the mobility indicator. The base station is further operable to determine a frequency of sending a timing advance command (TAC) medium access control (MAC) control element (CE) based on the mobility status indicator of the user equipment.

The base station is further operable to determine a value of a time alignment timer (TAT) based on the mobility status indicator of the user equipment.

A User Equipment (UE) of a wireless communications network, for controlling uplink transmission timing, the UE being operable to: determine a distance limit; and determine whether to use the timing advance command to resume uplink synchronization based on the determined distance limit.

The UE is further operable to: apply the timing advance command to resume uplink synchronization if a travelled distance of the UE since the TAT has expired is within the distance limit; and ignore the timing advance command to resume uplink synchronization if the travelled distance of the UE since the first timing advance command being applied exceeds the time limit.

The distance limit can be calculated based on a timing error limit value, the speed of light, and whether the stored timing advance is adjusted by the user equipment or timing advance is adjusted when TAT is not running.

The UE is further operable to: estimate the travel distance of the user equipment; and determine whether to use timing advance command to resume uplink synchronization based on the determined distance limit and the estimated travelled distance of the user equipment.

The UE is further operable to: apply timing advance command to resume uplink synchronization if the estimated travelled distance of the user equipment is smaller than the distance limit of the user equipment; and ignore timing advance command to resume uplink synchronization if the estimated travelled distance of the user equipment is larger than or equal to the distance limit of the user equipment.

A base station of a wireless communications network, for controlling uplink transmission timing, the base station being operable to: determine a distance limit; and determine whether to use the timing advance command to resume uplink synchronization based on the determined distance limit.

The base station is further operable to: apply the timing advance command to resume uplink synchronization if a travelled distance of the UE since the TAT has expired is within the distance limit; and refrain from apply the timing advance command to resume uplink synchronization if the travelled distance of the UE since the first timing advance command being applied exceeds the time limit.

The distance limit can be calculated based on a timing error limit value, the speed of light, and whether the stored timing advance is adjusted by the user equipment or timing advance is adjusted when TAT is not running.

The base station is further operable to: estimate the travel distance of the user equipment; and determine whether to use timing advance command to resume uplink synchronization based on the determined distance limit and the estimated travelled distance of the user equipment.

The base station is further operable to: apply timing advance command to resume uplink synchronization if the estimated travelled distance of the user equipment is smaller than the distance limit of the user equipment; and refrain from applying timing advance command to resume uplink synchronization if the estimated travelled distance of the user equipment is larger than or equal to the distance limit of the user equipment.

A User Equipment (UE) of a wireless communications network, for controlling uplink transmission timing, the UE being operable to: detect a mobility status of the UE; and configure the frequency of transmitting one or more Uplink Control Information (UCI) types to a predetermined value.

The UE is further operable to determine how to apply the timing advance command based on the determination that the UE is stationary.

The UE is further operable to: pause time alignment timer (TAT) when the UE is determined to be stationary; and start the TAT when the UE start uplink transmission or receive the TAC MAC CE. The one or more UCI types include one or more of channel state information (CSI), a precoding matrix index (PMI), a precoding type indicator (PTI), a rank indicator (RI), or a sounding reference signal (SRS).

The predetermined value of the frequency of the one or more UCI types may be indicated as a field of a MAC-mainconfig information element included in RRC connection reconfiguration message, wherein the field is denoted by uci-FrequencyStational. The UE is further operable to: receive the uci-FrequencyStational information element; and configure the frequency of transmitting one or more UCI types to be uci-FrequencyStational times a long DRX cycle. When DRX is configured, the UE is further operable to: refrain from transmitting sounding reference signal (SRS) when the following conditions are met: not in Active Time; or in Active Time, uci-FrequencyStational is configured by upper layer, the UE detects stationary state, and on DurationTimer is running, a long discontinuous reception (DRX) cycle is used, and an on-duration period of the DRX cycle does not satisfy uci-FrequencyStational.

When discontinuous reception (DRX) mode is configured, the UE is further operable to refrain from reporting one or more of CQI/PMI/RI/PTI on PUCCH if channel quality indicator masking (cqi-Mask) is setup by upper layers when: on DurationTimer is not running; or on DurationTimer is running, when uci-FrequencyStational is configured by upper layer and the UE detects stational state, a long DRX cycle is used, and an on-duration period of the DRX mode does not satisfy uci-FrequencyStational.

When discontinuous reception (DRX) mode is configured, the UE is further operable to refrain from reporting CQI/PMI/RI/PTI on PUCCH if CQI masking (cqi-Mask) is not setup by upper layers and when: not in Active Time; or in Active Time, when uci-FrequencyStational is configured by upper layer and the UE detects stational state, an on DurationTimer is running, a long DRX cycle is used, and an on-duration period of the DRX mode does not satisfy uci-FrequencyStational.

A base station of a wireless communications network, for controlling uplink transmission timing, the base station being operable to: determine the frequency of receiving the one or more UCI types; and determine the mobility status of the UE based on the frequency of receiving the one or more UCI types.

The base station is further operable to determine how to apply the timing advance command based on the determined mobility status of the UE. The base station is further operable to determine the mobility state of the UE as not stationary, and start applying TAC MAC CE. The base station is further operable to set the TAT to infinity based on the determination that the UE is stationary.

The one or more UCI types include one or more of channel state information (CSI), a precoding matrix index (PMI), a precoding type indicator (PTI), a rank indicator (RI), or a sounding reference signal (SRS). The base station is further operable to indicate the predetermined value of the frequency of the one or more UCI types may as a field of a MAC-mainconfig information element included in RRC connection reconfiguration message, wherein the field is denoted by uci-FrequencyStational.

A User Equipment (UE) of a wireless communications network, for controlling uplink transmission timing, the UE being operable to: receive a Timing Advance Command (TAC) Medium Access Control (MAC) Control Element (CE) for uplink transmission timing; and receive instruction from a base station if the UE receives TAC MAC CE when a Time Alignment Timer (TAT) is expired.

The instruction is included in broadcast or dedicated Radio Resource Control (RRC) signaling. The UE is further operable to apply TAC and restart the TAT. The UE is further operable to apply TAC and restart TAT if less than a specified time has elapsed since TAT expiry.

The UE is further operable to apply TAC and restart TAT if UE speed is less than a specified value. The UE is further operable to apply TAC and restart TAT if UE travel distance is less than a specified value. The UE is further operable to not apply TAC and initiate a random access procedure instead. The instruction is included in broadcast or dedicated Radio Resource Control (RRC) signaling.

A base station of a wireless communications network, for controlling uplink transmission timing, the base station being operable to: apply a Timing Advance Command (TAC) Medium Access Control (MAC) Control Element (CE) to resume uplink synchronization; and send instruction from a base station if the UE receives TAC MAC CE when a Time Alignment Timer (TAT) is expired.

A method for controlling uplink transmission timing of a wireless communications network, the network comprising a base station and a User Equipment (UE), the method, performed by the base station, comprising: detecting the UE staying in a cell more than a predetermined time; and applying a Timing Advance Command (TAC) Medium Access Control (MAC) Control Element (CE) to resume uplink synchronization.

A base station of a wireless communications network, for controlling uplink transmission timing, the base station being operable to: detect a UE staying in a cell more than a predetermined time; and apply a Timing Advance Command (TAC) Medium Access Control (MAC) Control Element (CE) to resume uplink synchronization.

What is claimed is:

1. A method executed by a User Equipment for controlling uplink transmission timing of a wireless communications network, the network comprising a base station and the UE, the method comprising:
   applying a first timing advance command to adjust uplink transmission timing;
   determining an expiration of a time alignment timer (TAT) associated with the first timing advance command;
   determining a time limit equal to an amount of time for an estimated uplink transmission error to exceed a predetermined timing error limit, wherein the estimated uplink transmission error is a timing difference between the uplink transmission timing and an estimated reference timing;
   receiving a second timing advance command after the expiration of the TAT; and
   determining whether to use the second timing advance command to resume uplink synchronization based on the determined time limit.

2. The method of claim 1 further comprising:
   if an amount of time from the expiration of the TAT to the receiving of the second timing advance command is within the determined time limit, using the second timing advance command to resume uplink synchronization; and
   if the amount of time from the expiration of the TAT to the receiving of the second timing advance command exceeds the determined time limit, refraining from using the second timing advance command to resume uplink synchronization.

3. The method of claim 1, wherein the estimated reference timing comprises an amount of time prior to an estimated downlink timing and the amount of time to keep transmission from the UE arriving within a processing or demodulation window of a base station.

4. The method of claim 3, wherein the amount of time includes an amount of time to compensate for UE mobility.

5. The method of claim 3, wherein a downlink timing comprises a time when a first detected path in time of a corresponding downlink frame is received by the user equipment.

6. The method of claim 1, further comprising:
   estimating a speed of the user equipment;
   determining a speed limit of the user equipment; and
   determining whether to use the second timing advance command to resume uplink synchronization based on the determined speed limit and the estimated speed of the user equipment.

7. The method of claim 6, wherein the speed limit of the user equipment is calculated based on the timing error limit value, the speed of light, whether the timing advance is adjusted by the user equipment or timing advance is adjusted when TAT is not running, and a resynchronization time that is the time taken to resynchronize an unsynchronized user equipment.

8. The method of claim 7, wherein the resynchronization time comprises:
   a detection time which is the time taken to detect that the user equipment is not uplink synchronized and plus a scheduling time which is the time taken to schedule and transmit a timing advance command for re-establishing uplink synchronization.

9. The method of claim 8, wherein the scheduling time further comprises a retransmission delay.

10. The method of claim 6, wherein the speed estimation is done by the network based on number of cells UE has visited per unit of time and cell radius information.

11. The method of claim 6, wherein the user equipment uses its geo-positioning capability and/or inertia sensor or accelerometer to estimate the speed or a range of speed of the user equipment.

12. The method of claim 11, further comprising:
   at the user equipment, sending the network a mobility status indicator; and
   at the base station, determining how to apply the second timing advance command based on the mobility indicator.

13. The method of claim 12 further comprising the base station determining a frequency of sending a timing advance command (TAC) medium access control (MAC) control element (CE) based on the mobility status indicator of the user equipment.

14. The method of claim 12 further comprising the base station determining a value of a time alignment timer (TAT) based on the mobility status indicator of the user equipment.

15. The method of claim 1, wherein the time limit is calculated based on at least one of the timing error limit value, the speed of light, an estimated speed of the user equipment, or whether a stored timing advance is adjusted by the user equipment or where a timing advance is adjusted when TAT is not running.

16. The method of claim 15, further comprising identifying an error margin of the estimated speed of the user equipment; and wherein the time limit is calculated further based on the error margin of the estimated speed of the user equipment.

17. The method of claim 15, further comprising:
   using the second timing advance command to resume uplink synchronization if the estimated speed of the user equipment is less than the speed limit of the user equipment; and
   not using the second timing advance command to resume uplink synchronization if the estimated speed of the user equipment is greater than the speed limit of the user equipment.

18. The method of claim 10, wherein the speed estimation is done by the network based on the UE staying in the cell for a time period greater than a threshold time period.

19. The method of claim 1, further comprising applying the second timing advance command to adjust uplink transmission timing.

20. A User Equipment (UE) for controlling uplink transmission timing of a wireless communications network, comprising:
one or more processors configured to:
apply a first timing advance command to adjust uplink transmission timing;
determine an expiration of a time alignment timer (TAT) associated with the first timing advance command;
determine a time limit equal to an amount of time elapsed for an estimated uplink transmission error to exceed a predetermined timing error limit, wherein the estimated uplink transmission error is a timing difference between the uplink transmission timing and an estimated reference timing;
receive a second timing advance command after the expiration of the TAT; and
determining whether to use the second timing advance command to resume uplink synchronization based on the determined time limit.

21. The UE of claim 20, the one or more processors further configured to:
if an amount of time from the expiration of the TAT to the receiving of the second timing advance command is within the determined time limit, use the second timing advance command to resume uplink synchronization; and
if the amount of time from the expiration of the TAT to the receiving of the second timing advance command exceeds the determined time limit, refrain from using the second timing advance command to resume uplink synchronization.

22. The UE of claim 20, wherein the estimated reference timing comprises an amount of time prior to an estimated downlink timing and the amount of time to keep transmission from the UE arriving within a processing or demodulation window of a base station.

23. The UE of claim 20, the one or more processors further configured to apply the second timing advance command to adjust uplink transmission timing.

* * * * *

UNITED STATES PATENT AND TRADEMARK OFFICE
CERTIFICATE OF CORRECTION

PATENT NO. : 9,167,547 B2  
APPLICATION NO. : 13/770376  
DATED : October 20, 2015  
INVENTOR(S) : Takashi Suzuki, Zhijun Cai and Andrew Mark Earnshaw It is certified that error appears in the above-identified patent and that said Letters Patent is hereby corrected as shown below:

In the claims

In column 31, Line 34, In Claim 1, after "time" insert -- elapsed --, therefor.

Signed and Sealed this
Twenty-fourth Day of May, 2016

Michelle K. Lee
*Director of the United States Patent and Trademark Office*